(12) United States Patent
Ryan et al.

(10) Patent No.: US 6,604,060 B1
(45) Date of Patent: Aug. 5, 2003

(54) METHOD AND APPARATUS FOR DETERMINING CC-NUMA INTRA-PROCESSOR DELAYS

(75) Inventors: Charles P. Ryan, Phoenix, AZ (US); Eric E. Conway, Mesa, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 315 days.

(21) Appl. No.: 09/607,023

(22) Filed: Jun. 29, 2000

(51) Int. Cl.[7] .................................................. G06F 11/30
(52) U.S. Cl. ........................ 702/186; 709/224; 714/12
(58) Field of Search ................................. 702/117, 118, 702/119, 121, 122, 123, 124, 182, 183, 184, 185, 186, 187, 188, 178, FOR 103, FOR 104, FOR 134, FOR 135, FOR 154, FOR 170, FOR 171; 714/25, 31, 47; 709/223, 224, 232, 233, 400; 711/130, 147; 375/356

(56) References Cited

U.S. PATENT DOCUMENTS

| | | | | |
|---|---|---|---|---|
| 5,964,846 A | * | 10/1999 | Berry et al. | 709/400 |
| 6,047,316 A | * | 4/2000 | Barton et al. | 709/216 |
| 6,058,149 A | * | 5/2000 | Sato | 375/365 |
| 6,314,463 B1 | * | 11/2001 | Abbott et al. | 709/224 |
| 6,332,008 B1 | * | 12/2001 | Giallorenzi et al. | 375/356 |
| 6,449,732 B1 | * | 9/2002 | Rasmussen et al. | 714/12 |
| 6,473,821 B1 | * | 10/2002 | Altmayer et al. | 710/240 |

* cited by examiner

Primary Examiner—Marc S. Hoff
Assistant Examiner—Mohamed Charioui
(74) Attorney, Agent, or Firm—Bruce E. Hayden; James H. Phillips

(57) ABSTRACT

In a Cache-Coherent Non-Uniform Memory Architecture (CC-NUMA), the time as measured in cycles that it takes for cache control signals to travel between processors (92) sharing an L2 cache (94) differs from the time it takes for those signals to travel between processors (92) not sharing the same L2 cache (94). This difference, or DELTA, is dynamically computed by computing (332) the time it takes for a invalidate cache line cache command to travel between a local processor (92) and a master processor (92). This computation (334) is then made for the time it takes the signal to travel between a remote processor (92) and the master processor (92). The difference (336) is the DELTA value in cycles. This DELTA value can then be utilized to bias delay values when exhaustively testing the interactions among multiple processors in a CC-NUMA environment (180).

15 Claims, 13 Drawing Sheets

METHOD AND APPARATUS FOR DETERMINING CC-NUMA INTRA-PROCESSOR DELAYS

CROSS REFERENCE TO RELATED APPLICATION

This application is related to our patent applications assigned to assignee hereof:

"APPARATUS FOR SYNCHRONIZING MULTIPLE PROCESSORS IN A DATA PROCESSING SYSTEM", filed Sep. 17, 1998, with Ser. No. 09/156,377;

"METHOD AND APPARATUS FOR EXHAUSTIVELY TESTING INTERACTIONS AMONG MULTIPLE PROCESSORS", filed Sep. 17, 1998, with Ser. No. 09/156,378;

"DATA PROCESSING SYSTEM PROCESSOR DELAY INSTRUCTION", filed Sep. 17, 1998, with Ser. No. 09/156,376; and This application is related to our copending patent application "DATA PROCESSING SYSTEM PROCESSOR DYNAMIC SELECTION OF INTERNAL SIGNAL TRACING", filed Dec. 23, 1999, with Ser. No. 09/472,114.

FIELD OF THE INVENTION

The present invention generally relates to multiprocessing computer systems, and more specifically to determining memory access delays in a CC-NUMA environment for use in exhaustively testing interactions among multiple tightly coupled processors.

BACKGROUND OF THE INVENTION

The literature is full of examples where processor and system faults or "bugs" were discovered long after the processors or systems were shipped to customers. It is well known that the later in the product cycle that a "bug" is discovered, the greater the expense to fix it. Compounding this problem is the trend towards shorter and shorter product cycles. Finally, the problem is compounded again by the trend towards tightly-coupled multiple processor computer systems. This compounding is because in such a tightly-coupled multiple processor system, it is not only necessary to discover and fix the faults in a single processor, it is also now necessary to discover and fix faults resulting from the interaction among the multiple processors.

One problem with implementing tightly coupled multiple processor computer systems are in exhaustively testing the interactions between and among multiple processors. For example, in a tightly coupled system, two or more processors may each have an individual high-speed level one (L1) cache, and share a slightly lower speed level two (L2) cache. This L2 cache is traditionally backed by an even larger main memory. The L1 and L2 caches are typically comprised of high speed Static Random Access Memory (SRAM), and the main memory is typically comprised of slower speed Dynamic Random Access Memory (DRAM).

It is necessary that the cache and memory be maintained for coherency. Thus, for example, at most only a single L1 cache of a single processor is allowed to contain a cache line corresponding to a given block of main memory. When multiple processors are reading and writing the same block in memory, a conflict arises among their cache controllers. This is conflict is typically resolved in a tightly coupled multiprocessor system with an interprocessor cache protocol communicated over an interprocessor bus. For example, a first processor may be required to reserve a cache copy of the contested block of memory. This is communicated to the other processors. However, if another (second) processor already has reserved the contested block of memory, the first processor must wait until the block is unlocked, and potentially written at least back to the L2 cache.

Debugging a cache protocol can be quite difficult. This stems from a number of interrelated factors. First, the multiple processors are each typically operating asynchronously from each other at extremely high frequencies or rates of speed. Secondly, the L1 caches, and their cache controllers are typically operating at essentially the same speed as the processors. Third, instruction cache misses for test instruction sequences can delay instruction execution by relatively long, somewhat variable, periods of time. There are a number of reasons for this later problem. One reason is it may be possible to retrieve a cache line of instructions from L1 cache or from L2 cache, or it may be necessary to load the cache line from slower main memory. The DRAM comprising the main memory typically operates quite a bit slower than the processor (and L1 cache). Another problem is that the time it takes to fetch a block of instructions from the main memory may vary slightly. There are a number of causes of this. First, accessing different addresses in the DRAM may take slightly different times. This is partly because of differing signal path lengths. Secondly, different memory banks may have slightly different timing. This is true, even when the specifications for the memories are equivalent. This is particularly true, when the memories are self-timed. This problem may be accentuated when multiple processors or multiple memories share a common memory access bus, where the actions of one processor or memory may lock out, and stall, another processor or memory. Note also that asynchronous Input/Output (I/O) operations to memory can have seemingly random effects on timing.

Despite the problems described above, in order to effectively test the interaction among multiple processors, it is preferable to exhaustively test each set of possible combinations. In the case of a cache protocol as described above, it is preferable to exhaustively test each possible set of cache states and cache state transitions. It is also preferable to be able to detect and record state changes at a lower level than that available to a user program.

In order to test the interactions among multiple processors, the various combinations of states and state transitions should be tested. This can be done by executing programs simultaneously on each of the processors. Varying the time when each processor executes its program can test the different combinations. Unfortunately, there is no mechanism in the prior art to accurately exhaustively vary the times when each processor executes its program. This is partly due to the processor instruction timing variations described above. The result is that timing windows often arise where particular state and state transition interactions are not tested.

One solution to this problem is to increase the number of tests run and the number of test cycles run. This increases the chances of uncovering faults, but does not guarantee exhaustive fault coverage.

Another set of prior art solutions is to try to control more closely the timing between executions of programs by the multiple processors. One such solution is to use NOP instructions to delay execution. The larger the number of NOP instructions executed, the longer the delay. However, NOP instructions are typically executed out of blocks of instructions held in cache lines. Each time execution crosses a cache line boundary, there is a potential for a cache miss, resulting in retrieving the cache line from slower memory. There is also a potential at that point that execution may be delayed for one or more cycles due to memory bus contention. Each of these potential delays introduces a potential window that did not get tested utilizing this set of solutions. Note also that virtual memory program activity must also be accounted for.

Another problem that arises is that it is often hard to distinguish states and state transitions from a programmer's view of a processor. This is partly because there is much that is not visible at this level. States and state transitions must therefore be assumed from visible programmer model level changes in the processor. This problem of distinguishing state and state transitions is a particular problem when the states and state transitions are cache states and state transitions during interaction testing among multiple processors.

One prior art solution to determining machine states and state transitions is through the use of SCAN. Using SCAN, a known pattern of states can be loaded into a processor. The processor then executes one or two instructions. The states of the various memory elements in the processor are then unloaded from the processor and compared with their expected values. This type of functional testing is becoming common for high-end microprocessors. Unfortunately, it does not lend itself to exhaustively testing the interactions among multiple processors. One reason for this is that a processor under the control of SCAN typically only executes for one or two instruction cycles, before the SCAN latches are unloaded, and another set of values loaded. The result of this is that SCAN is extremely slow, especially in comparison to the speed of modem processors. This significantly reduces the amount of testing that can be realistically done with SCAN. Secondly, there is no readily apparent mechanism available to test multiple processors at the same time, and more importantly to vary the start times of each of the multiple processors being tested together.

In the past, it has been sometimes been possible to run enough signals out of a processor that the states and state transitions being tested can be monitored by test equipment. One problem with this method of testing is that it is a manual and error prone process. Just as important, this method is fast becoming less and less possible as more and more functionality is embedded on single chips. Pin-count has become a major concern, and it has become increasingly unlikely that precious external pins can be dedicated for the sort of interprocessor state testing described above.

Testability, and thus reliability through earlier fault detection would be significantly increased in tightly coupled multiprocessor systems if the interactions among multiple processors could be accurately exhaustively tested, with the guarantee that no timing windows were inadvertently left untested. This testability would be further enhanced by a mechanism for recording states and state transitions over a series of clock cycles for each of the processors being tested.

One problem that arises when exhaustively testing the interactions among multiple processors occurs when it takes signals differing lengths of time to travel between various pairs of processors. This is the case in a Cache Coherent Non-Uniform Memory Architecture (CC-NUMA) such as where there are multiple processor modules, with each processor module containing multiple processors sharing a cache memory. These differing lengths of time can bias and interfere with the exhaustive testing of the interactions among multiple processors.

One solution would be to "hard code" delay values depending on whether or not processors were in the same processor module, and thus shared a cache memory. Unfortunately, the actual delays tend to vary slightly between different computer systems, over time, and as technology changes. It would thus be advantageous to be able to utilize accurate intra-processor delay times when exhaustively testing the interactions among processors.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

In a Cache-Coherent Non-Uniform Memory Architecture (CC-NUMA), the time as measured in cycles that it takes for cache control signals to travel between processors sharing an L2 cache differs from the time it takes for those signals to travel between processors not sharing the same L2 cache. This difference, or DELTA, is dynamically computed by computing the time it takes for a invalidate cache line cache command to travel between a local processor and a master processor. This computation is then made for the time it takes the signal to travel between a remote processor and the master processor. The difference is the DELTA value in cycles. This DELTA value can then be utilized to bias delay values when exhaustively testing the interactions among multiple processors in a CC-NUMA environment.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
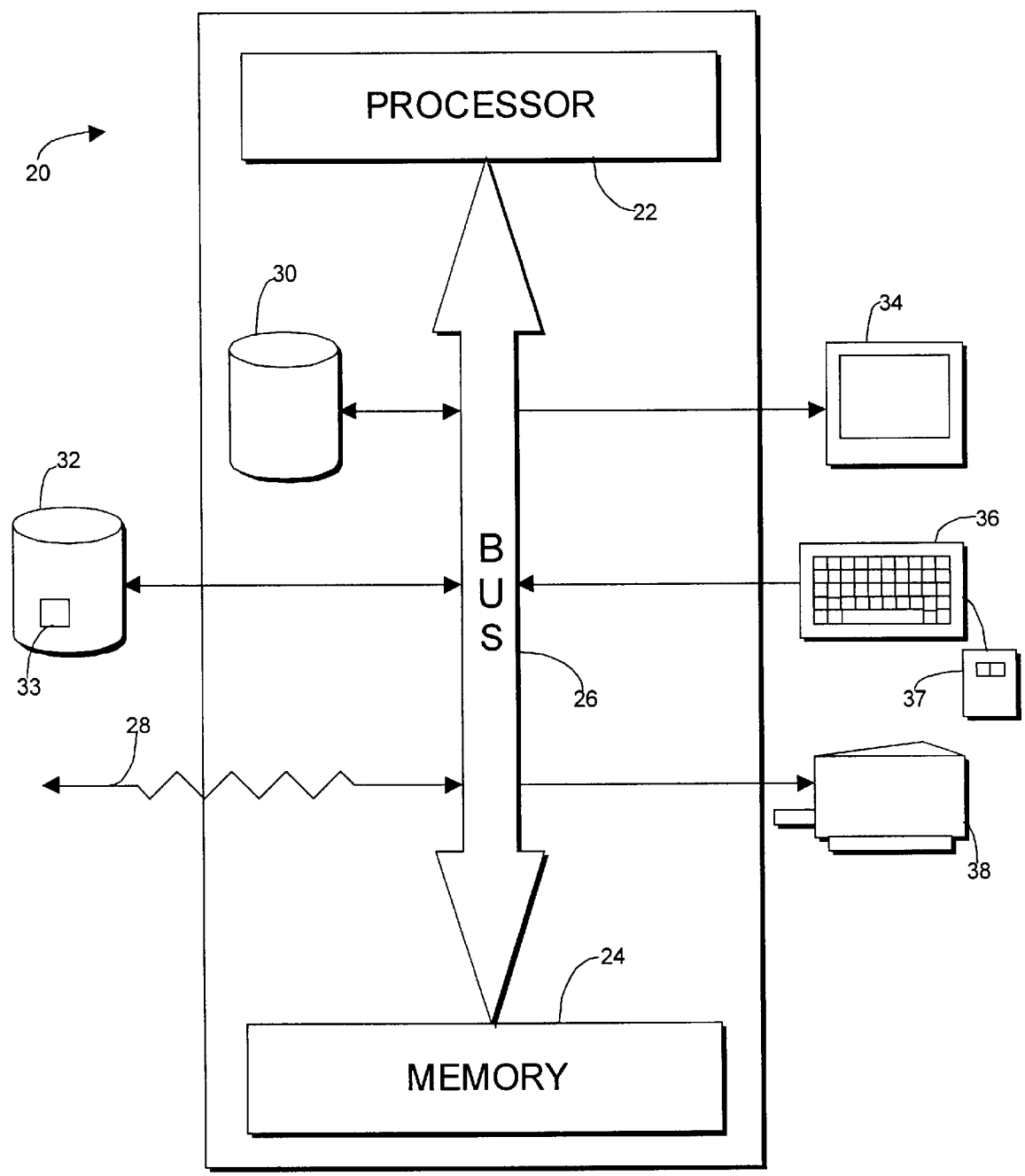
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
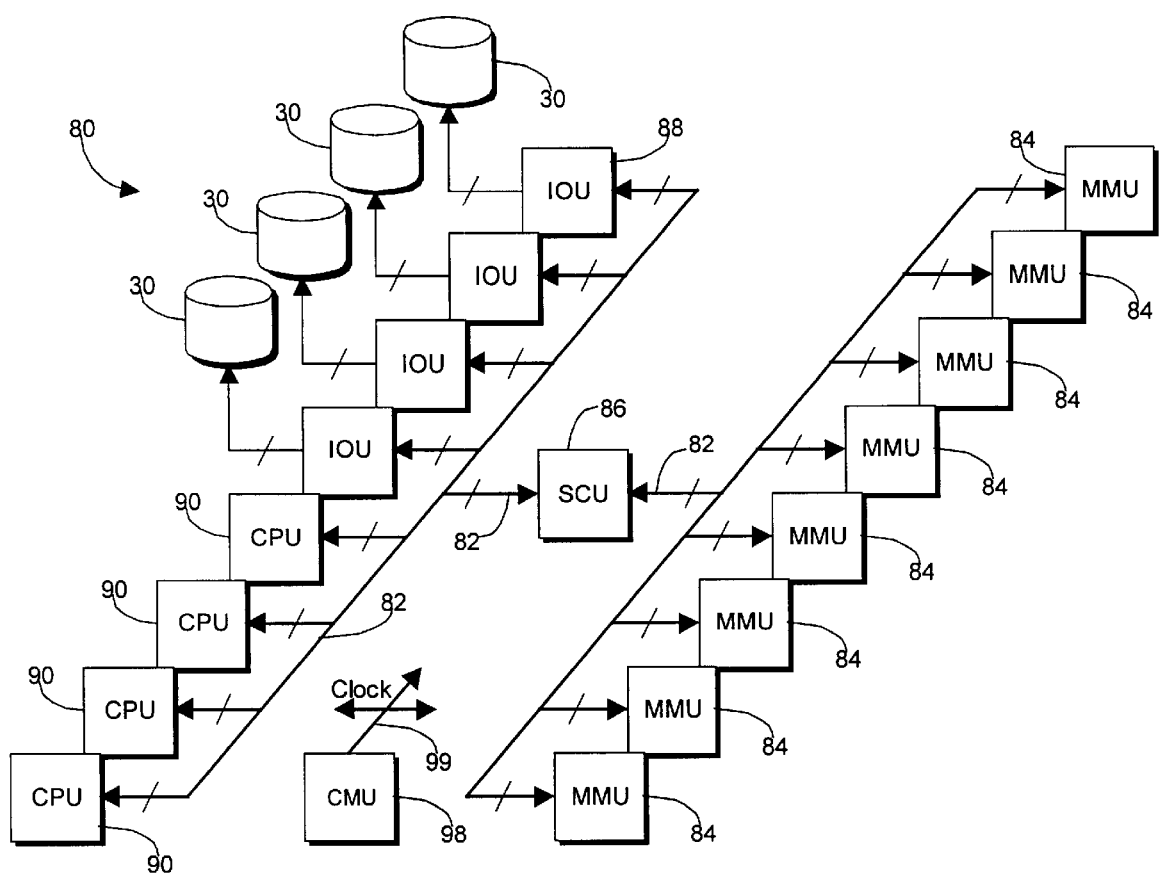
FIG. 2 is a block diagram of a more detailed view of a multiprocessor data processing system, in accordance with the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant. Note also that in the preferred embodiment, multiple Clock Management Units 98 are utilized to provide a redundant clock signal 99.

Figure 3:
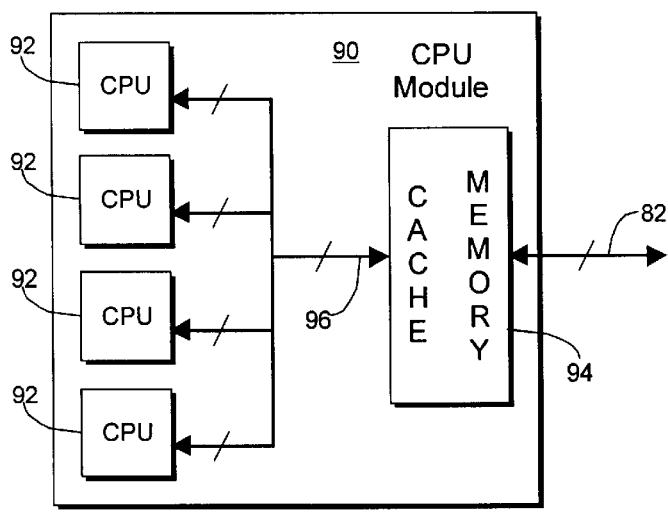
FIG. 3 is a block diagram illustrating a processor (CPU) module as shown in FIG. 2.

FIG. 3 is a block diagram illustrating a processor (CPU) module 90 as shown in FIG. 2. The CPU module 90 contains a plurality of processors (CPU) 92 and a cache memory system 94. In the preferred embodiment, each processor (CPU) module 90 contains up to four (4) processors (CPU) 92. The processors 92 and the cache memory system 94 are coupled together and communicate over an intraprocessor bus 96.

The cache memory system 94 is shared among the processors 92 on the CPU module 90 and maintains cache copies of data loaded into those processors 92. The cache memory system 94 is considered here a Level 2 cache and is coupled to and communicates with the storage control system (SCU) 88 over the intramodule bus 82 in order to maintain cache coherency between Level 1 cache memories 94 on each of the processor modules 90, as well as between cache memories 54, 56 in each of the processors 92, and on the IOU modules 88. The SCU 88 also maintains coherency between the various cache memories 94, 54, 56, and the typically slower speed memory in the MMU modules 84. In the preferred embodiment, a single block of memory will be owned by a single cache or memory at potentially each level in the memory hierarchy. Thus, a given memory block may be owned by one Level 1 cache 54, 56, by one Level 2 cache 94, and by one MMU 84.

Figure 4:
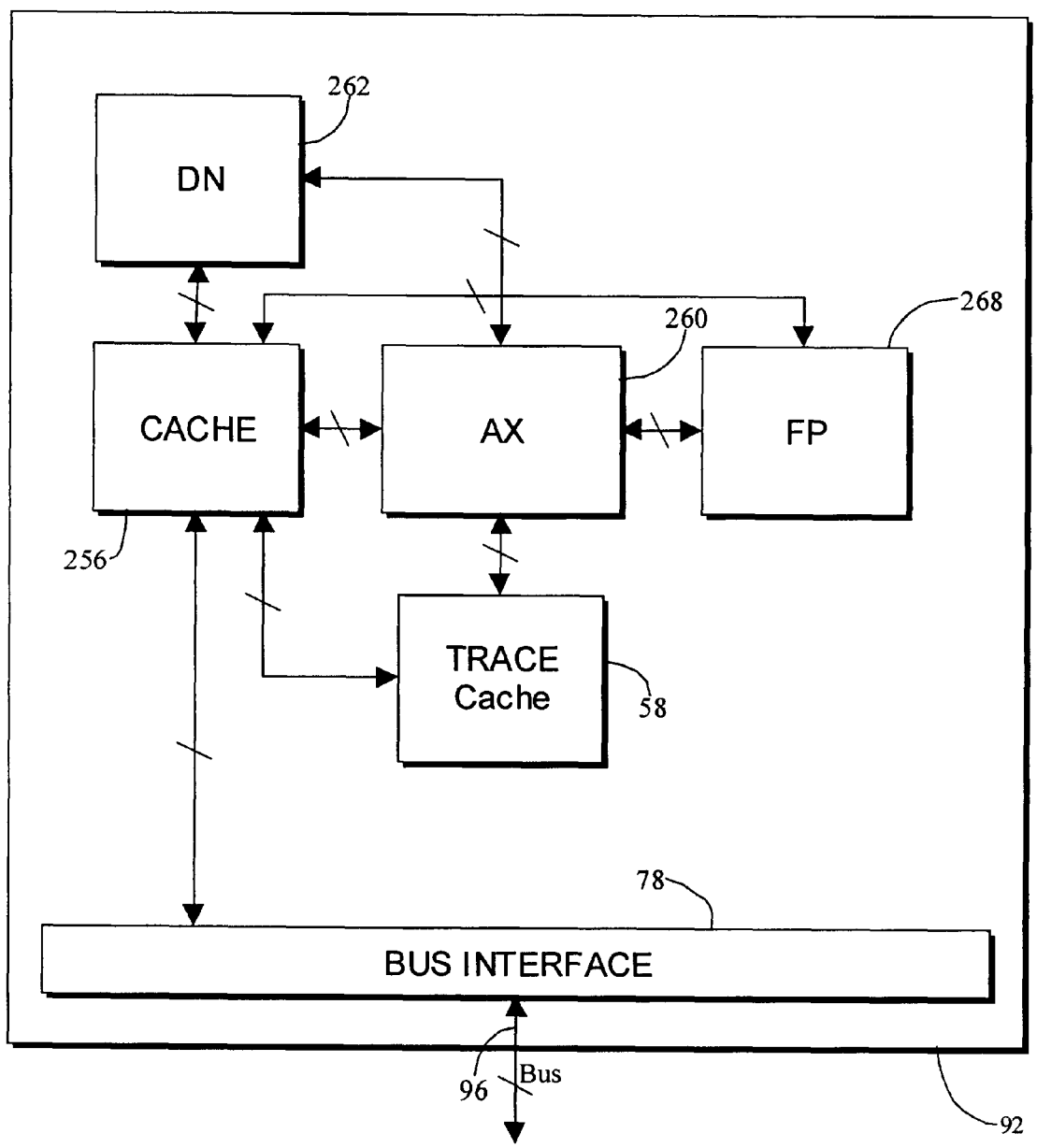
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local cache 256. Cache memories, such as this unified local cache 256, are typically constructed as high speed Static Random Access Memories (SRAM). In the preferred embodiment, the local cache 256 is incorporated on the same integrated circuit as the remainder of the processor 92. The local cache 256 is the primary block that interfaces with the bus interface 78. Data and instructions are loaded via the bus 96 into the local cache 256, and data is written back from the local cache 256 via the bus 96.

The local cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating point unit 268 performs both floating point operations, and fixed point multiplications and divisions. It is bidirectionally coupled to the local cache 256. The decimal/numeric (DN) unit 262 performs decimal and string operations. It is bidirectionally coupled to the local cache 256, allowing it to operate relatively autonomously from the AX unit 260. Rather, once decimal or string operations are initiated in the DN unit 262, the DN unit 262 is driven by operand availability in the local cache 256.

Bidirectionally coupled to both the AX unit 260 and the local cache 256 is a Trace RAM cache 58 which is capable of caching the status of instruction or cache operation. The Trace RAM 58 is controlled by commands decoded and executed by the AX unit 260. The Trace RAM 58 also selectively traces AX unit 260 statuses. The Trace RAM 58 receives and selectively traces cache state signals from the local cache 256. When a Trace is complete, the Trace RAM 58 can be written out to the local cache 256, and ultimately to slower memories.

Figure 5:
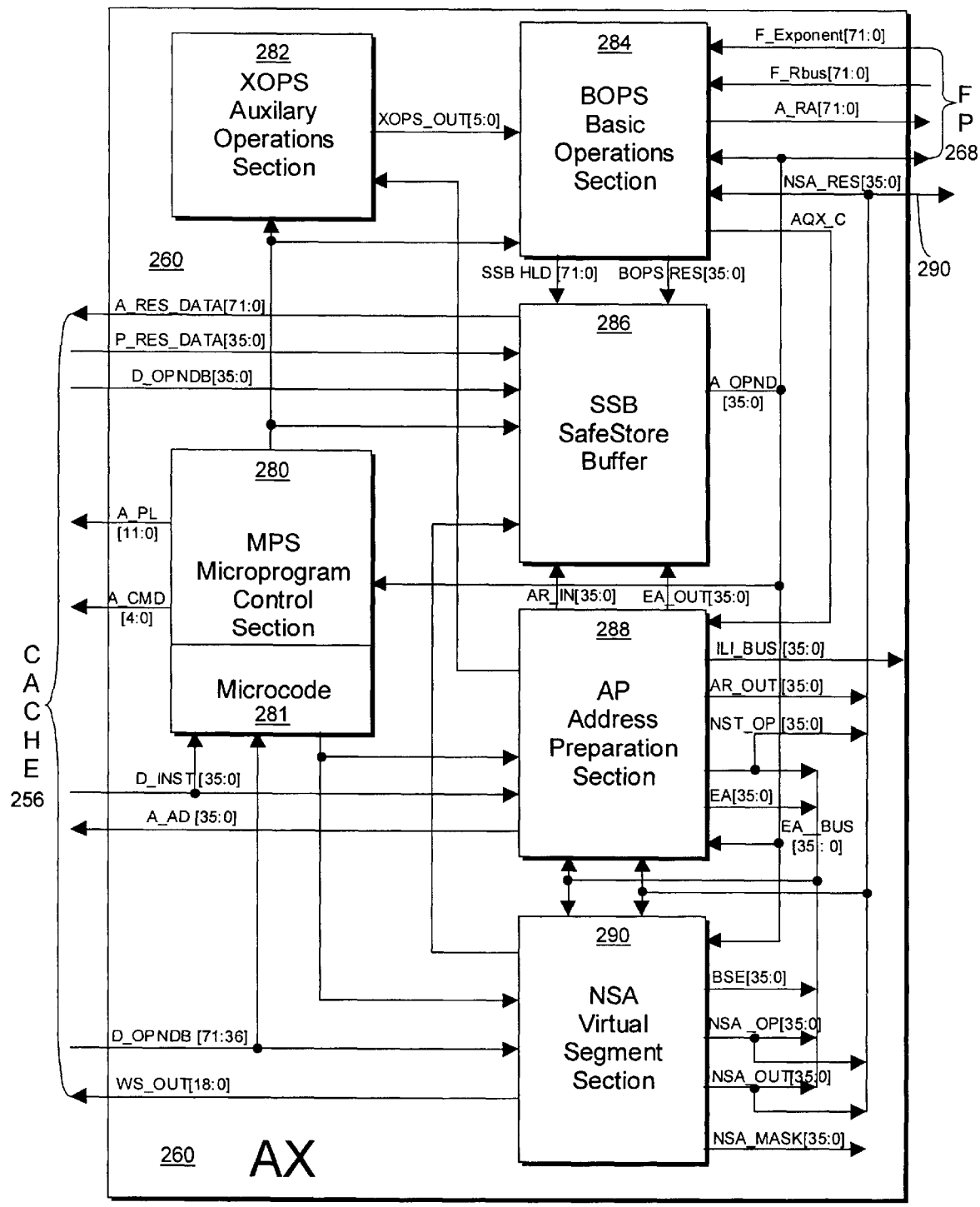
FIG. 5 is a block diagram of an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The MPS 280 is bidirectionally coupled to and receives instructions from the local cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262, the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 stores the current status of the processor 92 environment, including user and segment registers, for the purpose of changing processor state. The SSB 286 is coupled to and receives signals from the BOPS 284, the AP section 288, the MPS 280, and the NSA 290. The SSB 286 is bidirectionally coupled to the local cache 256, allowing SSB 286 frames to be pushed out to cache 256 when entering a new processor environment, and pulled back from cache 256 when returning to an old processor environment.

In the preferred embodiment, the Wait for Sync (WSYNC), Transmit Sync (TSYNC), Delay (DELAY), Trace (TRACE), and Dump Trace (DTRACE) instructions are decoded and executed under microprogram control by the MPS 280 unit in the AX unit 260. The Transmit Sync (TSYNC) instruction generates a Synchronize (SYNCHRO) signal and the Wait for Sync (WSYNC) is activated upon receipt of a Synchronize (SYNCHRO) return signal. Operation of the TSYNC instruction is shown in more detail in FIG. 10. Operation of the WSYNC instruction is shown in more detail in FIG. 11. Operation of the DELAY instruction is shown in more detail in FIG. 12.

Figure 6:
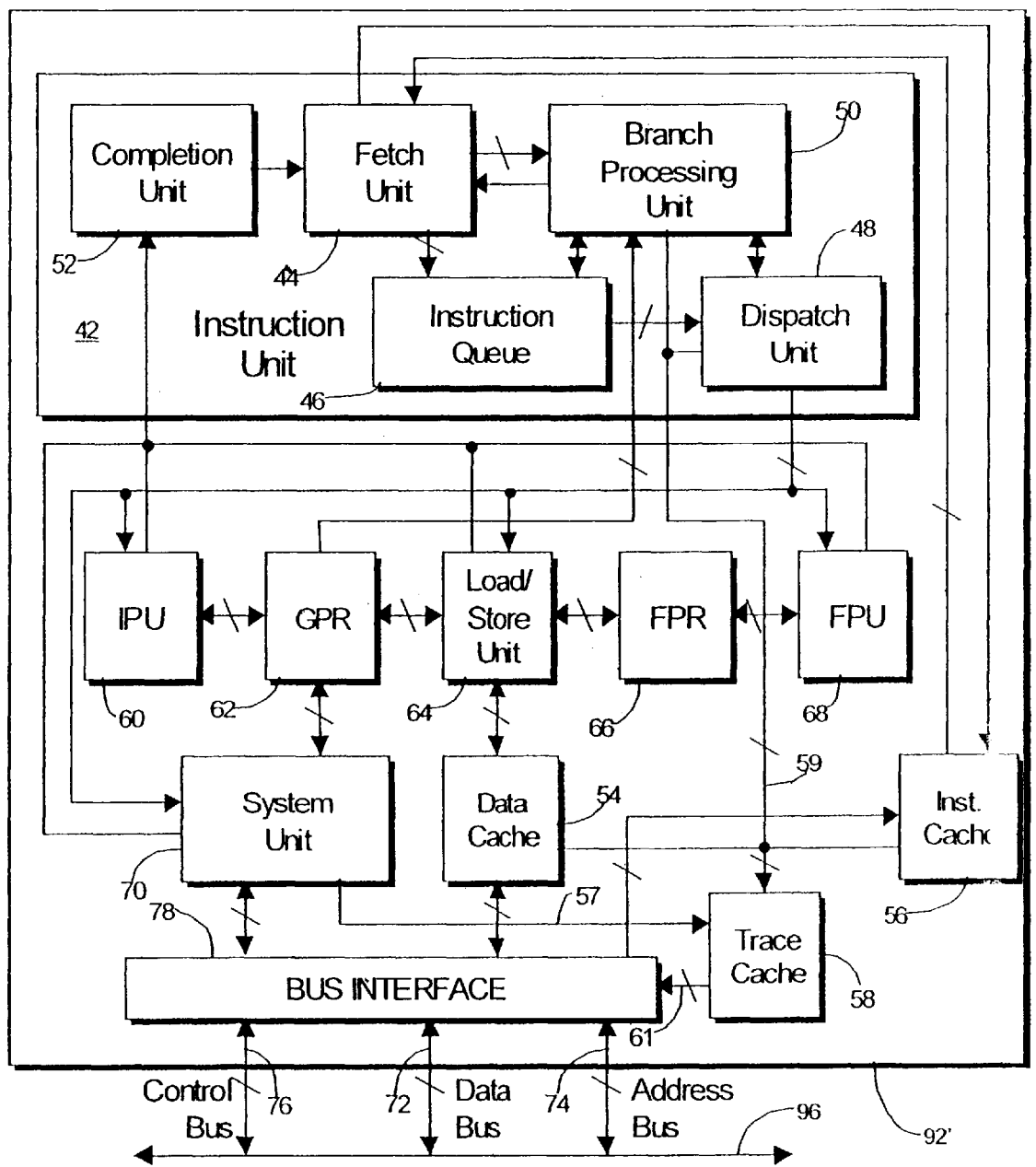
FIG. 6 is a block diagram of a piplelined processor as shown in FIG. 3.

FIG. 6 is a block diagram of an alternate embodiment of the processor 92 as shown in FIG. 3. This alternate embodiment shows a pipelined processor 92' capable of simultaneously executing multiple instructions. The processor 92' is coupled to a bus 96. The bus 96 comprises a data bus 72, a address bus 74, and a control bus 76. Such a bus 96 is typically implemented as a hierarchy of busses. In this instance, the data bus 72, address bus 74, and control bus 76 together comprise a processor bus. The data bus 72, the address bus 74 and the control bus 76 are coupled to a bus interface 56. The bus interface 56 is coupled to a data cache 54, an instruction cache 56, and a Trace cache 58. The data cache 54, the instruction cache 56, and the Trace cache 58 are typically constructed of high speed SRAM. The coupling between the data cache 54 and the bus interface 58 is typically bidirectional, whereas the coupling between the bus interface 58 and the instruction cache 56 is typically single directional, since there is typically no need to write instructions back to slower memory (not shown). As noted in FIG. 3, the Instruction Cache 56, and Data Cache 54 are Level 1 caches in the memory hierarchy in the preferred embodiment.

The instruction cache 56 is coupled to and provides instructions to an instruction execution unit 52. The instruction execution unit 52 shown preferably provides for pipelined execution of multiple instructions, synchronization of out-of-order execution, and branch prediction. However, these optimizations are not necessary to practice this invention. The instruction execution unit 52 provides control signals to control execution of an Integer Processing Unit 60, a load/store unit 64, a floating point unit 68, and a systems unit 70. The load/store unit 64 is bidirectionally coupled to the general purpose registers 62, the floating point registers 66 and the data cache 54. The load/store unit 64 loads values into the general purpose registers 62 and floating point registers 66 from the data cache 54, and writes them back to the data cache 54, as required.

The general-purpose registers 62 are bidirectionally coupled to and utilized by the integer-processing unit 60 to perform integer arithmetic, as well as other logical functions. Such an integer processing unit 60 typically comprises logical/shift modules, integer addition/subtraction modules, and integer multiplication/division modules. The integer processing unit 60 will typically set condition code flags in one or more condition code registers in the general purpose registers 62 based on the results of the arithmetic and logical functions performed. These condition code flags are provided to the instruction execution unit 52 for use in conditional branching. In this preferred embodiment, the integer processing unit 60 provides for arithmetic and logical functions. The general-purpose registers 62 are also bidirectionally coupled to and utilized by the systems unit 70 to perform systems functions. The systems unit 70 executes various system-level instructions, including instructions to change environment or state. In order to maintain system state, most of the instructions executed by the systems unit 70 are completion-serialized. The floating point registers 66 are bidirectionally coupled to and utilized by the floating-point unit 68 to perform floating-point arithmetic functions.

A single integer processing unit 60 and floating point unit 68 are shown in this FIG. This is done here for clarity. It should be understood that typically this alternate embodiment will include multiple such functional units 60, 66. A pipelined processor 92' such as shown here will typically contain multiple integer processing units 60 providing multiple concurrent integer computations, and multiple floating point units 68 providing multiple concurrent floating point computations.

The Instruction Unit 42 comprises an instruction fetch unit 44, an instruction queue 46, an instruction dispatch unit 48, a branch processing unit 50, and an instruction completion unit 52. The instruction fetch unit 44 is coupled to and receives instructions from the instruction cache 56. The instructions fetch unit 44 provides instruction fetch control signals to the instruction cache 56. Fetched instructions are transmitted upon demand from the instruction fetch unit 44 to the instruction queue 46 for queuing. The queued instructions are subsequently removed from the instruction queue 46 and dispatched to the function units 60, 64, 68, 70 for processing by the instruction dispatch unit 48. Multiple instructions will typically be in simultaneous execution at the same time in a pipelined system. Upon completion of each of the dispatched instructions, the completing function units 60, 64, 68, 70 provide instruction completion signals to the instruction completion unit 52. The instruction completion unit 52 is coupled to and thereupon notifies the instruction fetch unit 44 of the instruction completions, allowing for further instruction fetches.

The branch-processing unit 50 is bidirectionally coupled to and receives branch instructions from the instruction fetch unit 44. The branch-processing unit 50 is coupled to and receives condition code information from the general-purpose registers 62. This condition code information is utilized by the branch-processing unit 50 to perform conditional branching. Modem branch processing units 50 in piplelined systems typically perform branch prediction and lookahead. When using branch prediction, a branch-processing unit 50 will typically provide control signals to the instruction fetch unit 44 to continue to fetch instructions until an unresolved conditional branch is resolved. The contents of general-purpose registers 62 are also received by the branch-processing unit 50 for use in indexed and indirect branching.

The systems unit 70 executes a number of instructions that are significant to the present invention. It executes a transmit Sync (TSYNC) instruction for transmitting a Synchronize signal to the other processors 92 in the system 80. It executes a wait-for-Synchronize (WSYNC) instruction for pausing a processor 92 until it receives the Synchronize signal from another processor 92. It executes a delay (DELAY) instruction for pausing or delaying a processor 92, 92' for a specified number of instruction. Finally, the systems unit 70 executes a Trace (TRACE) instruction for controlling operation of the Trace cache 58.

The Trace cache 58 receives Trace signals 59 from different modules in the processor 92. Each of these modules provides information that can be potentially traced. In the embodiment shown in FIG. 6, the Trace cache 92 is coupled to and receives Trace signals 59 from the data cache 54, the instruction cache 56, the branch processing unit 50, and the dispatch unit 48. The Trace signals 59 from the data cache 54 and the instruction cache 56 include internal cache state signals. This provides a mechanism for recording in real time state changes for the cache memories 54, 56. The Trace cache is coupled to and provides a Trace output signal 61 to the bus interface 78. This allows the contents of a Trace buffer to be selectively written to and saved in slower speed memory 24 in an MMU 84. This is typically done at the end of a Trace so that the data traced can be processed.

Figure 7:
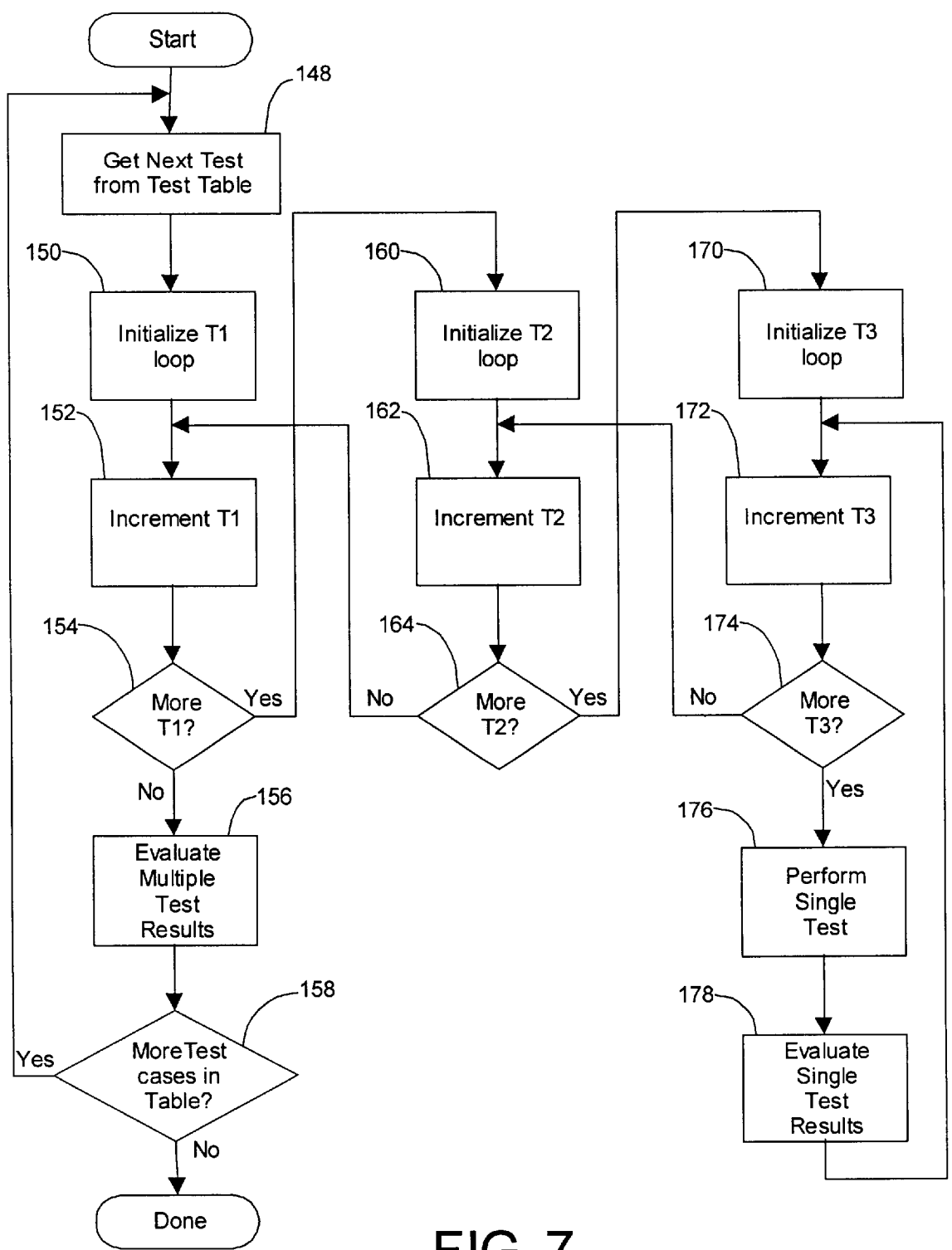
FIG. 7 is a flowchart illustrating exhaustive testing of the interaction between multiple processors in a single system, in accordance with the present invention.

FIG. 7 is a flowchart illustrating exhaustive testing of the interaction between multiple processors 92 in a single system 80. Table T-1 illustrates the instructions executed by three different processors 92.

TABLE T-1

| T | Processor #1 Instructions | | Processor #2 Instructions | | Processor #3 Instructions | |
|---|---|---|---|---|---|---|
| 1 | TSYNC | | WSYNC | | WSYNC | |
| 2 | TZE | Error | TZE | Error | TZE | Error |
| 3 | DELAY | T1 | DELAY | T2 | DELAY | T3 |
| 4-n | <test#1 code> | | <test#2 code> | | <test#3 code> | |
| N+1 | DTRACE | Done | DTRACE | Done | DTRACE | Done |

In order to exhaustively test the interaction among multiple processors 92, the above sequence of code can be executed on each of the processors 92. One of the processors (here processor #1) executes a TSYNC instruction, which transmits a Synchronize signal to all of the other processors 92 in the system 80. All of the processors being tested, including the processor executing the TSYNC instruction, then wait for receipt of the Synchronize signal through execution of an WSYNC instruction. At this point, all of these processors are synchronized, each being ready to execute their next instruction at the next common clock 99 signal edge. Each processor then starts the relevant traces by executing a TRACE instruction and delays for a specified number of clock 99 cycles by executing a DELAY instruction. Note that since each of the tested processors executes an WSYNC, TRACE, and DELAY instruction for each test run, any two or more of these instructions may be combined into a single instruction. For example, the WSYNC instruction may be implemented as having a clock count delay operand, resulting in a specified number of clock cycles of delay after receipt of the Synchronize signal. In the preferred embodiment, the WSYNC instruction both waits for the Synchronize signal, and then starts Tracing. The preferred embodiment also includes both WSYNC and TRACE functionality in the TSYNC instruction. Two-hundred fifty-six (256) Trace entries are then traced, and the Trace then automatically terminates. Note also that the traces may be started earlier, especially if Trace entries are allowed to wrap around the Trace RAM 210. The exhaustive testing is accomplished by varying T1, T2, and T3 for the three processors through their respective ranges. This is preferably done through use of a three level loop structure in a test driver program.

After each processor 92 is synchronized with the other processors 92, has delayed its proscribed number of clock 99 cycles, and has the appropriate traces turned on, each of the processors 92 will execute a series of test instructions. For example, when testing cache memories 54, 56, the processors 92 will execute instructions affecting the state of the cache 256. The processors implementing such cache memory testing may cause their respective caches 256, to compete for ownership of a given range of addresses of memory. The cache states for the relevant caches 256 are received on the Trace input signal lines 59 by the Trace Cache 58 and written into the Trace RAM 210 every clock 99 cycle during the test. At the end of the test, the Trace is turned off by either writing a predetermined number of Trace entries to the Trace RAM 210, filling up the Trace RAM 210 with Trace entries, or execution of a Dump Trace (DTRACE) instruction. In any case, the contents of the Trace RAM 210 for each of the processors 92 is then written to slower (usually DRAM) memory 24 contained in the MMU modules 84 for subsequent evaluation. The Trace entries saved in the MMU module 84 memories may also be written to secondary storage 80 for later evaluation, or for archival purposes. The testing is then run again, with a different combination of T1, T2, and T3 values for the three processors. This is repeated until all interesting combinations of these three timing delay values have been tested.

FIG. 7 is a flowchart illustrating a method of exhaustive testing of the interaction between multiple processors 92 in a single system 80. The method utilizes the code shown and discussed in Table T-1. In this test example, the interaction of three processors 92, P1, P2, and P3 is tested. Each of the three processors 92 utilizes a corresponding delay value TI, T2, and T3, for delaying the execution of its test code. The method starts by entering an outer loop. First, the next test cases are loaded from a test table, step 148. Next, a T1 delay value loop index is initialized, step 150. A second loop is then entered. The T1 delay value is then incremented, step 152, and a test is made whether the T1 delay value is within range, step 154. If the T1 delay value is within a range specified in the test table entry, step 154, a third loop is entered. In the third loop, the T2 delay value is first initialized, step 160. The T2 delay value is then incremented, step 162, and a test is made whether the T2 delay value is within range, step 164. If the T2 delay value is within a range specified in the test table entry, step 164, a fourth, inner, loop is entered. In the fourth loop, the T3 delay value is first initialized, step 170. The T3 delay value is then incremented, step 172, and a test is made whether the T3 delay value is within range, step 174. If the T3 delay value is within a range specified in the test table entry, step 174, a single test is performed, as shown in Table T-1, step 176, utilizing the T1, T2, and T3 delay values computed in the three embedded loops. At the end of the single test, the single test run results are evaluated, as appropriate, step 178. The inner loop then repeats, starting with incrementing the T3 delay value, step 172. When the T3 delay value exceeds its specified range, step 174, the fourth loop is complete, and the third loop is repeated, starting with incrementing the T2 delay value, step 162. When the T2 delay value exceeds its specified range, step 164, the third loop is complete, and the second loop is repeated, starting with incrementing the T1 delay value, step 152. When the T1 delay value exceeds its specified range, step 154, the second loop is complete. At this point in the method, the interaction over the specified ranges of T1, T2, and T3 for a particular test case in the test table have been exhaustively tested. The test results from the multiple tests are then evaluated, step 178. A test is then made whether there are any more test cases to test in the test table, step 158. If there are more test cases to test, the outer loop is repeated, starting with loading the next test entry from the test table, step 148. Otherwise, when there are no more test cases to test in the test table, step 158, the method is complete. It should be noted that the three embedded loops can be viewed as three embedded "DO" or "FOR" loops, incrementing T1, T2, and T3 through their prescribed ranges. The use of these three embedded loops for testing three processors is for illustrative purposes only. More or fewer embedded loops, for testing correspondingly more or fewer processors, are within the scope of the present invention.

Figure 8:
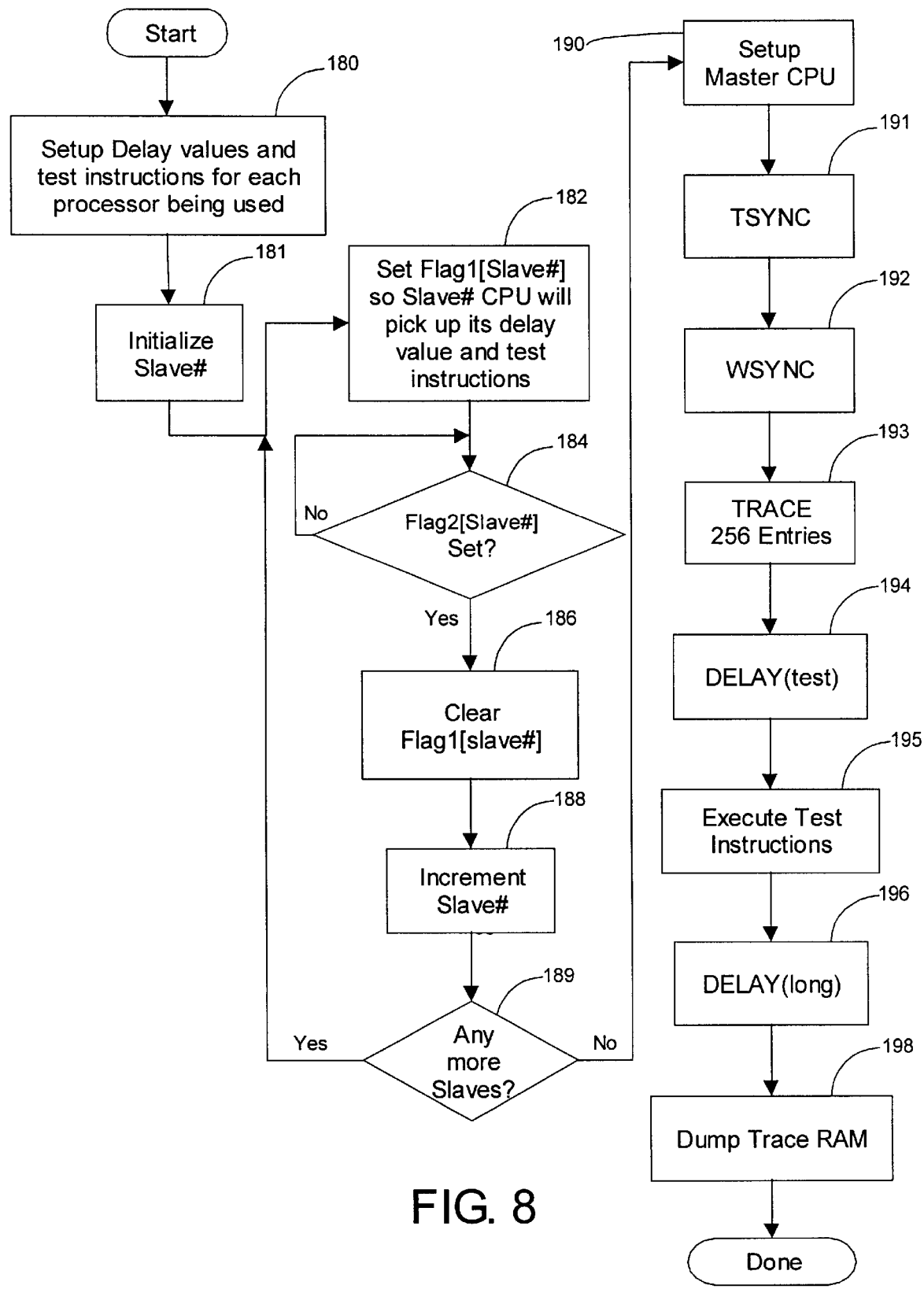
FIG. 8 is a flowchart illustrating operation of a master processor during one execution of a Perform Single Test step shown in FIG. 7.

FIG. 8 is a flowchart illustrating operation of a master processor during one execution of the Perform Single Test step 176 in FIG. 7. The Perform Single Test, step 176, starts by setting up the delay values and test instructions for each processor being utilized, step 180. In the example in FIG. 7, the delay values for the three processors are the loop indices: T1, T2, and T3. The test instructions for a given test typically remain constant throughout a given set of tests. A slave number (Slave#) loop index is initialized, step 181, and a loop is then entered. At the top of the loop, a Flag1 corresponding to the slave being setup (Flag1[Slave#]) is set so that that slave will know to pick up its delay and test instructions, step 182. The master processor then spins on a second flag (Flag2[Slave#]) until that second flag is set, step 184. The second flag (Flag2[Slave#]) is set by the slave processor when it has completed setting up for testing, and is ready to execute a WSYNC instruction (see step 144 in FIG. 9). The first flag (Flag1[Slave#]) is then cleared, step 186, for preparation for the next execution of the Perform Single Test, step 176. The Slave# loop index is then incremented, step 188, and a test is made whether any more slaves need to be setup. If more slaves remain to setup, the loop is repeated, setting up the next slave, starting with step 182.

When no more slaves remain to be setup, step 189, the master processor is setup, step 190. This setup is similar to the setup performed for each of the slave processors. In particular, the test delay value is typically loaded into a register. After setting up for testing, a TSYNC instruction is executed, step 191, resulting in a Synchronize signal being transmitted to all of the processors 92 in the data processing system 80. This is followed by execution of a WSYNC instruction, step 192, which awaits receipt of the Synchronize signal just transmitted. Upon receipt of the Synchronize interrupt, a TRACE is initiated, tracing 256 entries to the Trace RAM Execution of the WSYNC will also preferably turn on tracing to the TRACE RAM, step 193. In this FIG., the TSYNC, 191, WSYNC, 192, and TRACE, 193, are shown separately. This is for illustrative purposes. In the preferred embodiment, these three functions are combined into the TSYNC instruction. After the Synchronize signal has been received, and tracing started to the Trace RAM 210, step 193, a DELAY instruction is executed in order to delay for a predetermined number of clock cycles, step 194. This is the delay value for the master processor resulting from the T1, T2, and T3 loops in FIG. 7. In the preferred embodiment, the delay value has been loaded into a register prior to executing the TSYNC, step 191, WSYNC, step 192, and TRACE, step 193, instructions. After the DELAY instruction, step 194, has completed waiting the prescribed number of clock cycles, the prespecified instruction test sequence is executed, step 195. Then, a second DELAY instruction is executed, step 196, for a long enough delay that all processors 92 being tested have completed their individual test. The Trace RAM 210 is then dumped to the system RAM, step 198, for later evaluation. Note that instead of the second DELAY instruction, step 196, other methods of processor 92 resynchronization may also be utilized, such as a second usage of the TSYNC and WSYNC instructions.

Figure 9:
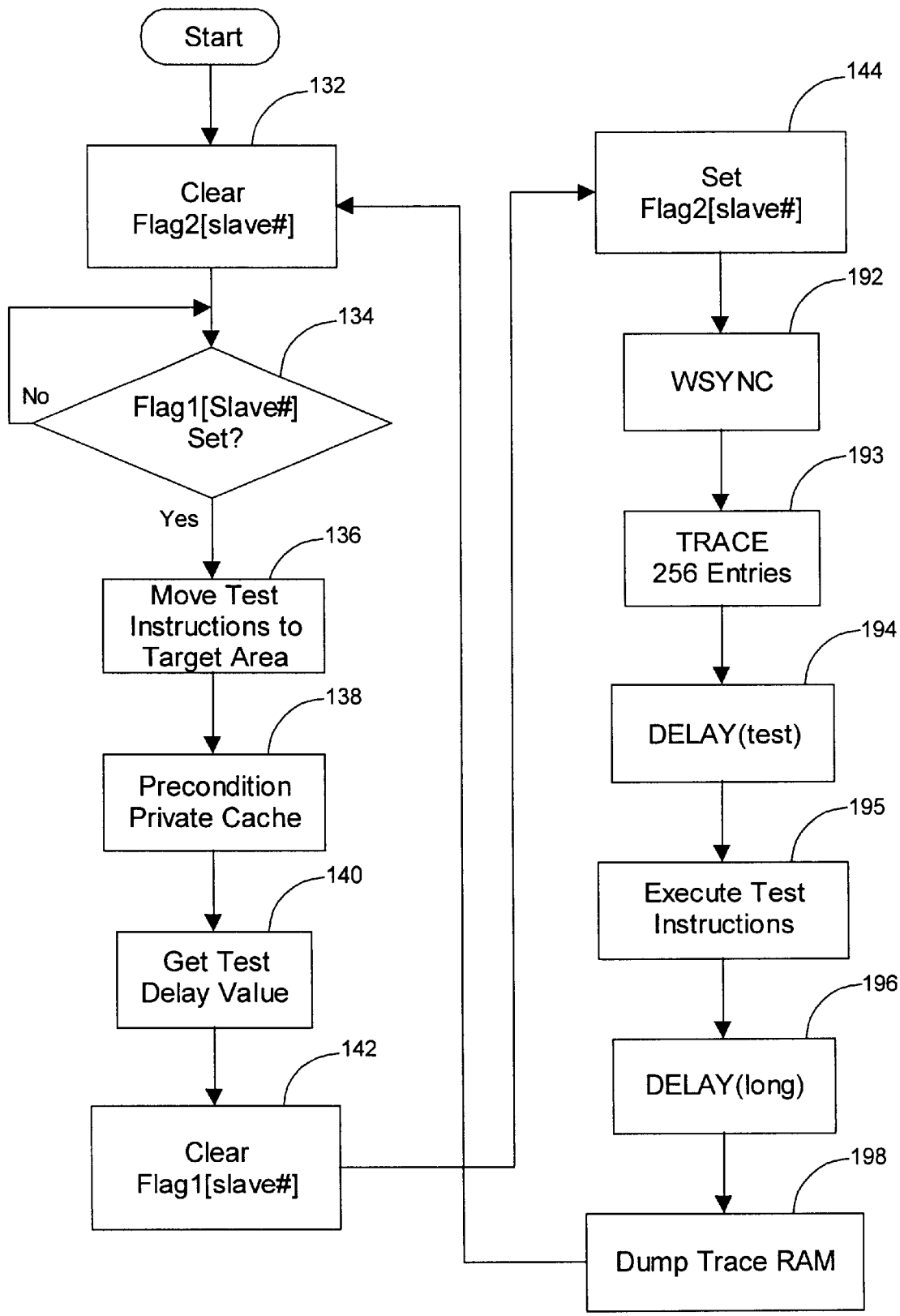
FIG. 9 is a flowchart illustrating of a slave processor during execution of multiple tests.

FIG. 9 is a flowchart illustrating operation of a slave processor during execution of multiple tests. The slave computer executes a continuous loop until terminated. At the top of the loop, the second flag (Flag2[Slave#]) for the slave processor is cleared, step 132. Then, the processor 92 spins until the first flag (Flag1[Slave#]) is set, indicating that a new set of delay values and test instructions is ready for use by this slave. The test instructions are then moved to a target area, step 136. The private cache 256 is preconditioned, step 138. This is especially important if the caching system is being tested. The test delay value is then loaded into a register, step 140. The first flag (Flag1[Slave#]) is then cleared, step 142, and the second flag (Flag2[Slave#]) is then set, step 144, indicating that the slave processor is ready for testing. The processor 92 then awaits synchronization by executing a WSYNC instruction, step 192. After receiving the synchronization signal transmitted as a result of the TSYNC instruction executed by the master processor, step 191, a TRACE instruction is executed, step 193, starting tracing to the Trace RAM 210, and a DELAY instruction is executed, step 194, delaying the number of clock cycles specified by the master processor. The test instructions for the slave processor are then executed, step 195, and a long delay is then entered, again by executing the DELAY instruction, step 196. Upon completion of the second DELAY instruction, step 196, the Trace RAM 210 is dumped to the system RAM, step 198, and the loop repeats, starting with clearing the second flag (Flag2[Slave#]). In this FIG., the WSYNC instruction, step 192, and the TRACE instruction, step 193, are shown as separate steps. This is illustrative. In the preferred embodiment, the functionality of both steps is combined into the WSYNC instruction.

Figure 10:
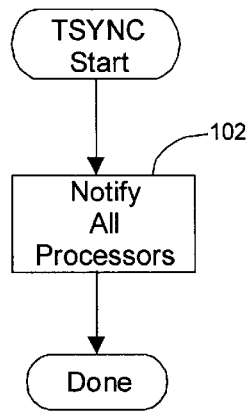
FIG. 10 is a flowchart illustrating operation of a Transmit Synchronize signal (TSYNC) instruction, in accordance with the present invention.

FIG. 10 is a flowchart illustrating operation of a Transmit Sync signal (TSYNC) instruction. A special Synchronize interrupt signal is transmitted to each of the processors 92 in the system 80. Note that the Synchronize interrupt signal is also broadcast to the processor 20 executing the TSYNC instruction. In the flowchart, a signal is transmitted to all processors 92, step 102, in the data processing system 80. In the preferred embodiment, the Synchronize interrupt signal is transmitted from the processor 92 executing the TSYNC instruction, and received by all the processors 92 in the data processing system 80 as the Receive Synchronize signal. Finally, in the preferred embodiment, the TSYNC instruction continues execution after step 102 by dropping into the WSYNC instruction functionality shown in FIG. 11.

Figure 11:
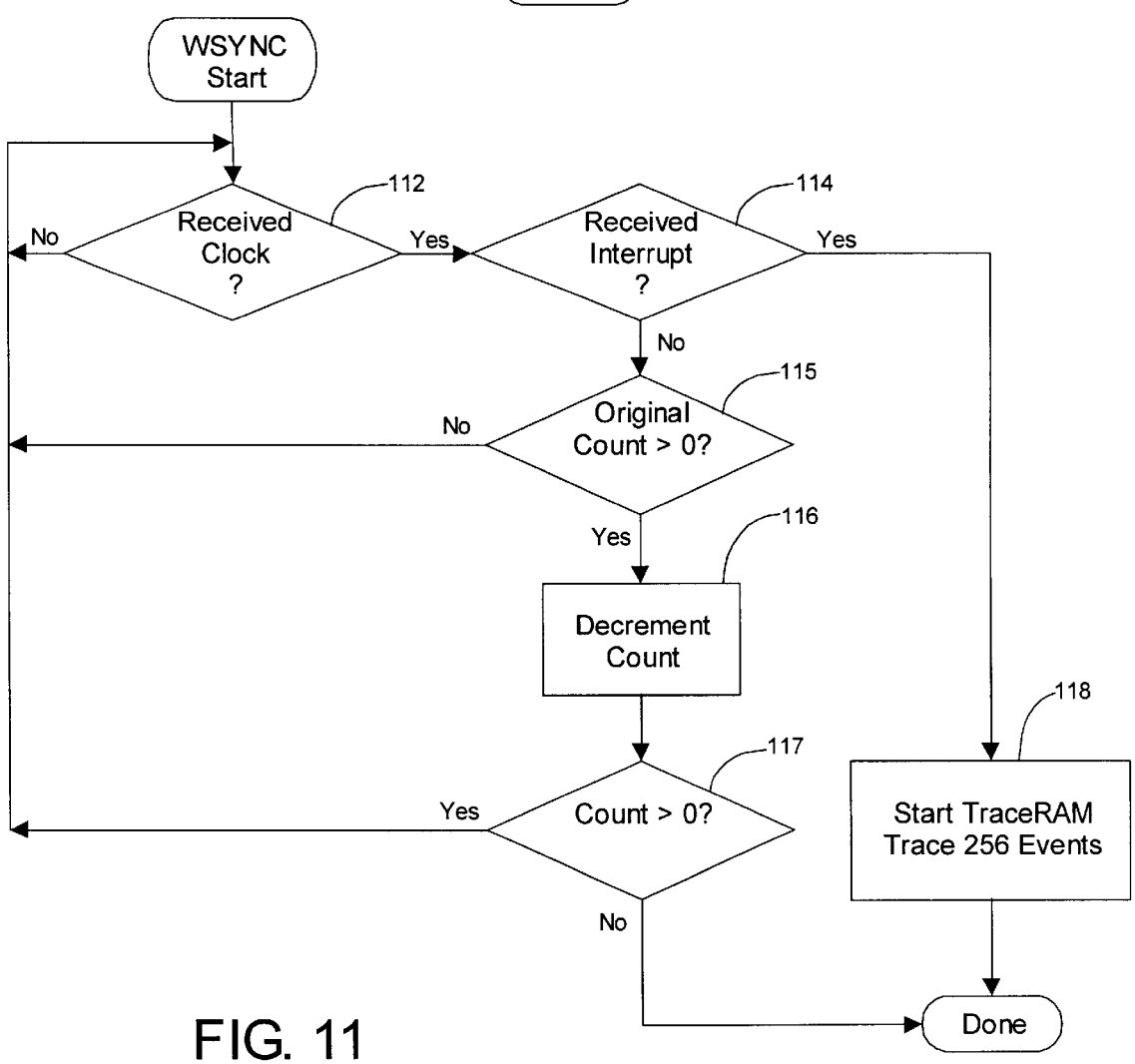
FIG. 11 is a flowchart illustrating operation of a Receive Synchronize signal (WSYNC) instruction, in accordance with the present invention.

FIG. 11 is a flowchart illustrating operation of a Wait for Sync signal (WSYNC) instruction. As noted above, execution of the TSYNC instruction shown in FIG. 10 drops into this functionality. In the preferred embodiment, the WSYNC and TSYNC instructions contain a maximum cycle count operand. This maximum cycle count operand can optionally be implemented as a register operand, an immediate operand, a sum of multiple registers, a sum of a register and an immediate operand, or indeed as any other type of operand supported by the architecture of the processors 92 in the data processing system 80. When a zero maximum cycle count operand is encountered during execution, the WSYNC instruction only terminates when the Synchronize interrupt is received. When a maximum cycle count operand greater than zero is encountered, a maximum cycle count is indicated. The instruction will thus terminate after that delay maximum cycle count of cycles have been encountered, or when the Synchronize interrupt is received, which ever comes first. Thus, a zero maximum cycle count operand can be viewed as an infinite maximum wait. If the maximum cycle count operand was loaded from a register, that register will receive the remaining number cycle count at the end of instruction execution. Thus, if the instruction terminates with a zero remaining cycle count stored in that register, and started with a maximum cycle count greater than zero, the instruction terminated due to having decremented the counter, and not from having received the Synchronize interrupt.

The WSYNC instruction effectively starts operation by entering into a loop. First, a check is made of the clock signal 99, step 112. If the relevant edge of the clock signal 99 has not been encountered, step 112, the loop is repeated, starting with the test whether the clock signal 99 edge has been received, step 112. Otherwise, a test is made whether the Synchronize signal has been received, step 114. If the Synchronize signal has not been received, step 114, a test is made whether the maximum cycle count operand was greater than zero, step 115. If the initial maximum cycle count operand was not greater than zero, step 115, the loop repeats, starting at step 112. However, if the original maximum cycle count operand was greater than zero, step 115, a timeout count is indicated. A register is loaded with the maximum cycle count value, and decremented step 116, and tested against zero, step 117, at every clock. As long as the decremented remaining cycle count is greater than zero, step 117, the loop repeats, starting at step 112. Otherwise, when the Synchronize interrupt has been received, step 114, tracing is started, step 118, and the loop terminates. In the preferred embodiment, 256 events are recorded in the Trace RAM, before the tracing is automatically terminated. Otherwise, if the remaining cycle count decrements to zero, step 117, the loop terminates. In the case of an initial maximum cycle count greater than zero, at the termination of the instruction execution, the remaining cycle count is made available in a register to provide an indication whether the WSYNC instruction terminated through a timeout, or through receipt of the Synchronize interrupt.

It should also be noted that a test is made for receipt of the Synchronize signal on the clock 99 edge. This is to guarantee that all processors 92 receive and respond to the Synchronize signal at exactly the same time. Secondly, note that in the flowchart a tight loop is shown where the executing processor spins, waiting for clock edges, step 112. This is for illustrative purposes. In the preferred embodiment, the WSYNC instruction is implemented utilizing a microcode engine 280 that executes a series of instructions implementing the remainder of the flowchart at each system clock cycle until the instruction terminates.

Figure 12:
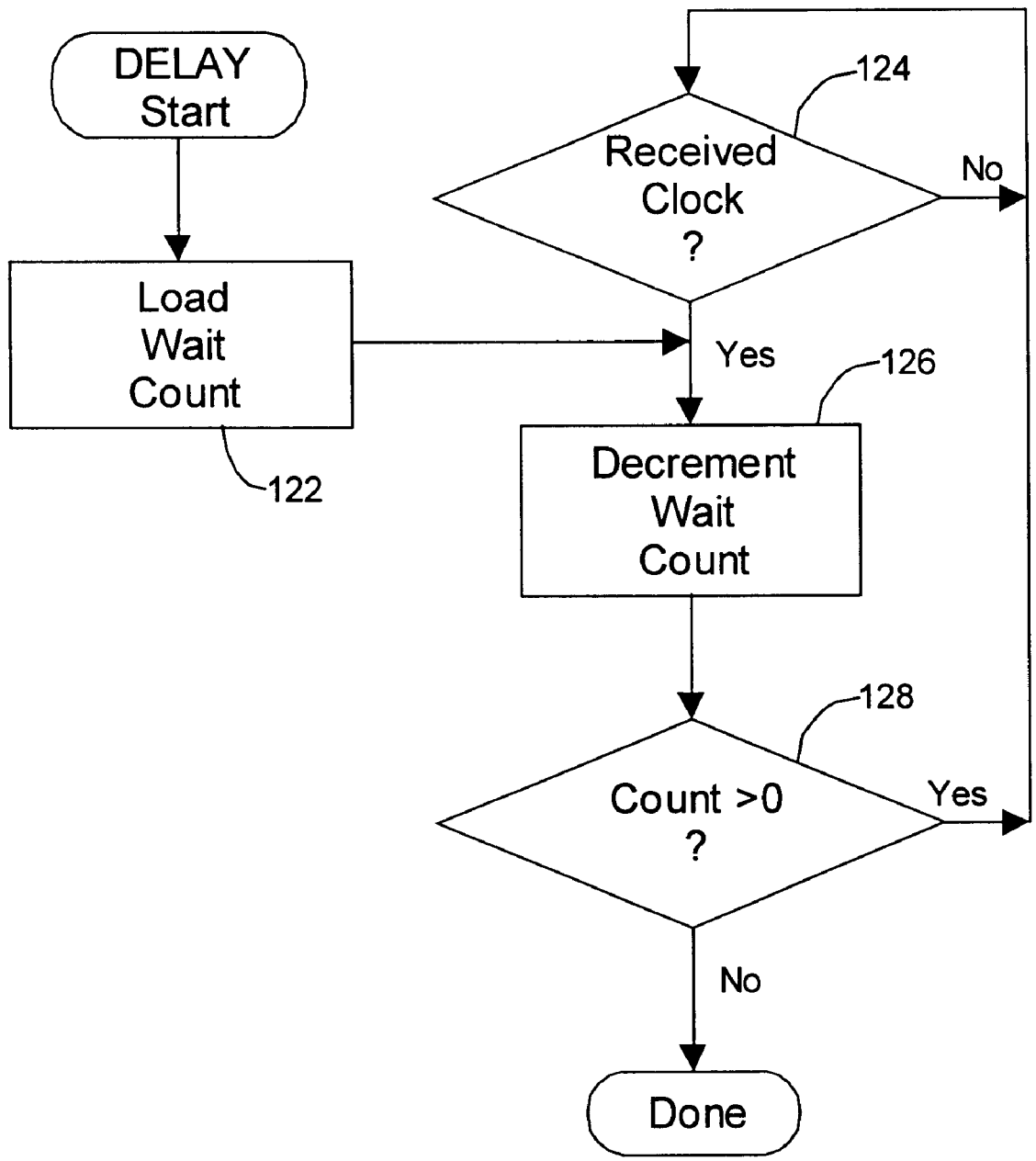
FIG. 12 is a flowchart illustrating operation of a delay (DELAY) instruction, in accordance with the present invention.

FIG. 12 is a flowchart illustrating operation of a delay (DELAY) instruction. The DELAY instruction has one or more operands to specify the number of instruction cycles to delay. This set of operands specifying the number of cycles to delay may be coded as an immediate operand, a register operand, the sum of a pair of registers, the sum of a register and an immediate operand, or indeed, any form of operand supported by the architecture. In an alternative embodiment, the number of cycles to delay can be specified in a fixed repeat count register. The DELAY instruction starts by loading the number of cycles to delay into a counter containing a remaining cycle delay count, step 122. A loop is then entered, and the remaining cycle delay count is decremented, step 126. A test is then made, comparing the remaining cycle delay count to zero. If the remaining cycle delay count is greater than or equal to zero (i.e. has not gone negative), step 128, the loop is repeated, starting with a test of the relevant edge of the clock signal 99. The loop spins, waiting for the relevant clock 99 edge. When the clock edge is detected, step 124, the remaining cycle delay count is again decremented, step 126, and again tested, step 128. The loop exits when the decrementing, step 126, causes the remaining cycle delay count to go negative, step 128. The result is that the instruction delays for exactly "N" clock 99 cycles, with "N" being the number of cycles to delay specified on the DELAY instruction. This provides a significant advantage when exhaustively testing interactions between multiple processors 92 since testing ranges can be known to have been exhaustively tested.

In the preferred embodiment, the Wait for Sync (WSYNC), Transmit Sync (TSYNC), and Delay (DELAY) instructions, and the Trace (TRACE) operation are decoded and executed under microprogram control by the MPS 280 unit in the AX unit 260. The Wait for Sync (WSYNC) and Transmit Sync (TSYNC) instructions utilize a Synchronize (SYNCHRO) signal and receive a Synchronize (SYNCHRO) return signal.

Figure 13:
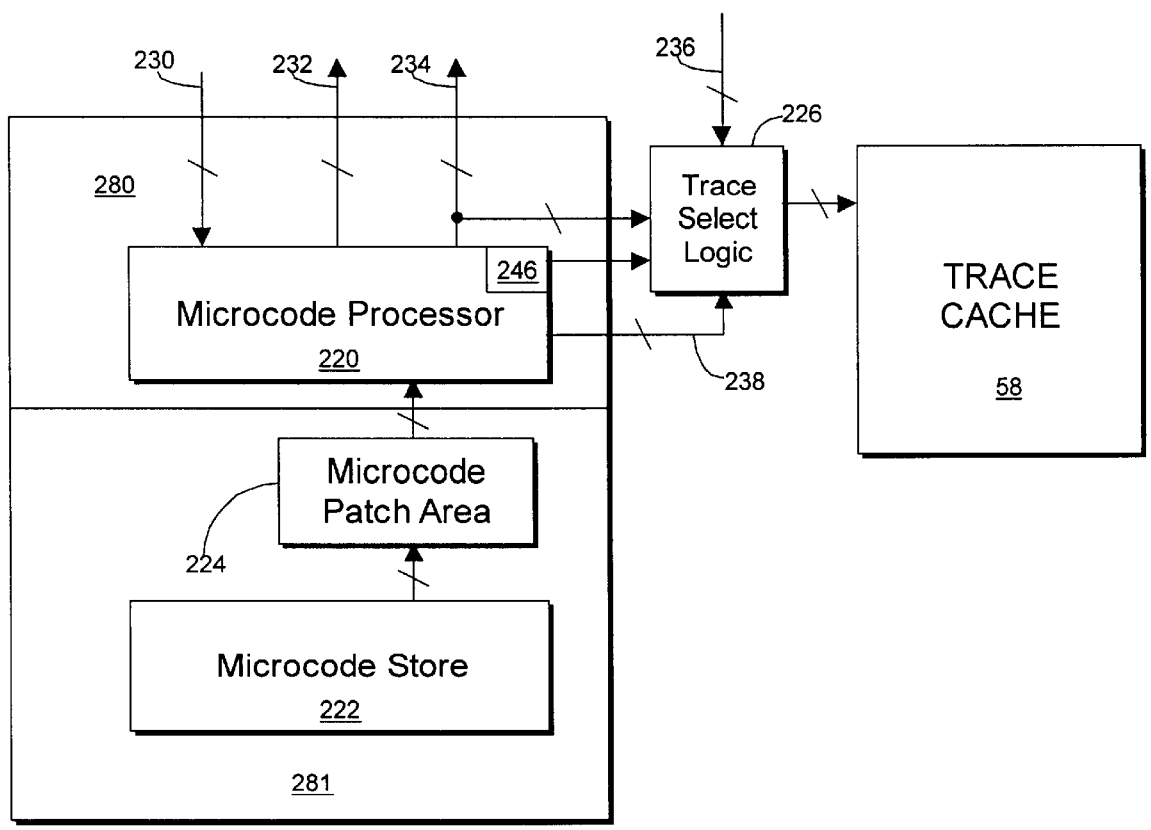
FIG. 13 is a block diagram of the Microprogram Control Section (MPS) shown in FIG. 5

FIG. 13 is a block diagram of the Microprogram Control Section (MPS) shown in FIG. 5. The Microprogram Control Section contains a Microcode engine or processor 220. Instructions for the Microcode processor 220 are stored in a Microcode Store 222. This is typically a Non-Volatile Memory. Also coupled to the Microcode processor 220 is a Microcode Patch Area 224. This Microcode Patch Area 224 is an associative memory with the associative key being microcode program addresses in the Microcode Store 222, and the associative data being microcode instruction words. A Microcode Address (MCAD) 246 provides a microcode program instruction address. As with most processors, the microcode processor 220 steps its instruction counter (MCAD) 246 through its code, fetching the next microcode instruction, until control flow is changed through a branch. The Microcode Address 246 is utilized to fetch the next microcode instruction word from the Microcode Store 222. However, if the Microcode Address (MCAD) 246 matches one of the associative keys in the Microcode Patch Area 224, the associated word from the Microcode Patch Area 224 is provided to the Microcode Processor 220 instead. The Microcode Patch Area 224 can be modified dynamically, allowing for dynamic microcode modification, even in situations where the microcode Store 222 is Non-Volatile.

The Microcode Processor 220 receives inputs and results from computations from the other function units in the AX 260 on an input bus 230 and provides signals directing operation of the functional units in the AX 260 on an output bus 232. The Microcode Processor 220 also provides signals to the Trace Select Logic 238. Also, the current Microcode Address (MCAD) 246 is provided to the Trace Select Logic 238. The Trace Select Logic 238 receives data inputs from the functional units in the AX 260, including the NSA Result Bus 290 (see FIG. 6). The NSA Result Bus 290 carries address preparation signals from the Address Preparation Section 288 and the NSA Virtual Segment Section 290. The Trace Select Logic 226 receives control inputs 238 from the Microcode Processor 220. The Trace Select Logic 226 selects which of its inputs are to be traced, and provides such to the Trace Cache 58.

Figure 14:
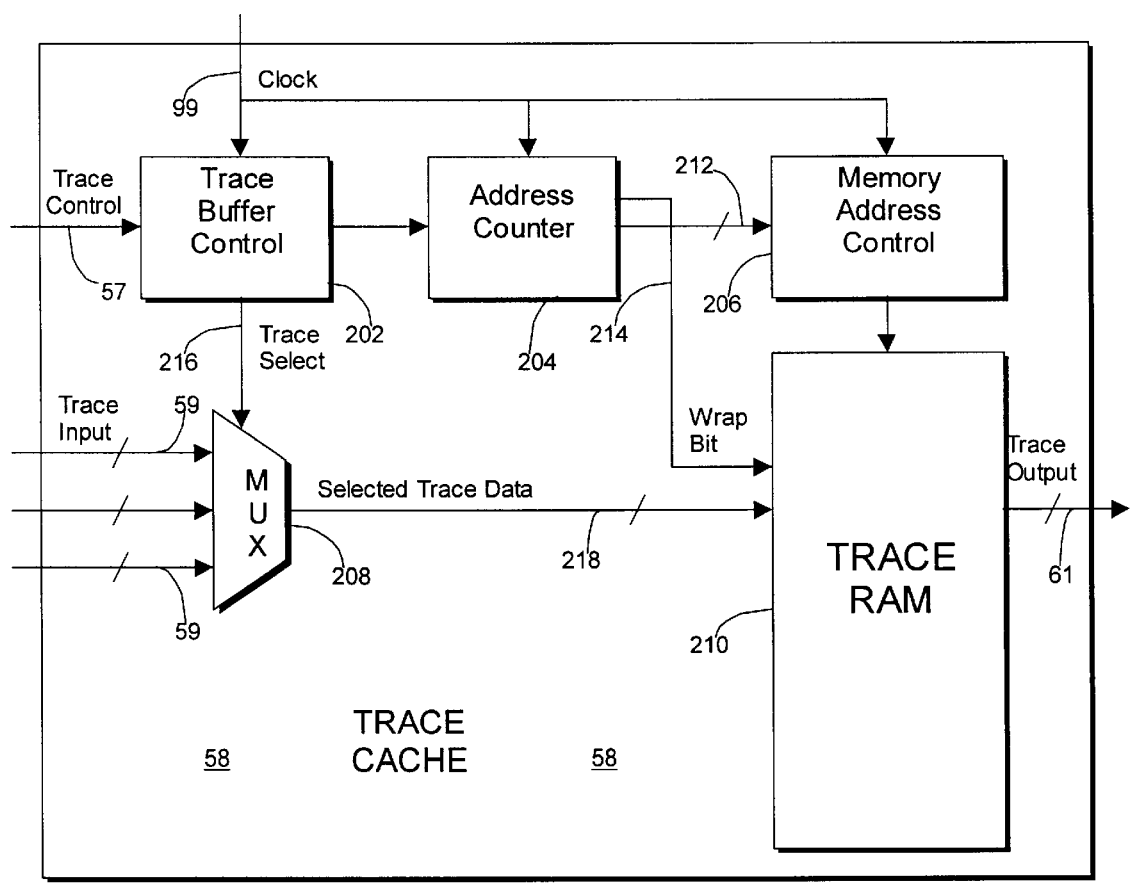
FIG. 14 is a block diagram illustrating the Trace cache shown in FIGS. 4 and 6.

FIG. 14 is a block diagram illustrating the Trace cache 58 shown in FIGS. 4 and 6. The systems unit 70 provides Trace control signals 57 to a Trace buffer control module 202 in response to execution of a Trace instruction. The Trace buffer control module 202 provides control signals to an address counter module 204. The address counter module 204 is typically reset by the Trace buffer control module 202 when a Trace is started. The address counter module 204 is a counter that increments at each clock 99. Address counter module 204 selectively either wraps around, or terminates a Trace, when it hits its limit. If the address counter module 204 terminates a Trace, the completion is transmitted to the completion unit 52. In any case, the address counter module 204 provides an address signal 212 to a memory address control module 206. The address signal 212 provided is the address of the next Trace entry in a Trace RAM array 210 to receive data. The memory address control module 206 stores a single Trace entry in the Trace RAM 210 at the address specified by the address signal 212 at assertion of each clock b signal.

Trace input signals 59 are coupled to and received by a multiplexor (MUX) 208. The Trace buffer control module 202 is coupled to and provides Trace select signals 216 to the MUX 208 to select Trace input signals 59 for tracing. The selection by the Trace buffer control module 202 is in response to execution of a TRACE instruction by the systems unit. The MUX 208 provides a Selected Trace Data signal 218 by selecting Trace input signals 59 in response to Trace select signals 216. The values of the Selected Trace Data signals 218 are written in the Trace Ram 210 at the location specified by the address counter 204 at the assertion of each clock 99. In one embodiment, a high-order bit from the address counter module 204 is written with each Trace entry in the Trace RAM 210. This provides a mechanism for continuously wrapping the Trace RAM 210 with Trace entries. Then, when the Trace data is downloaded to slower memory and evaluated, the Trace entries can be properly unrolled based on this wrap bit 214, since the wrap bit 214 toggles for each cycle through the Trace RAM 210.

The Trace cache 58 operates by storing one entry into the Trace RAM 210 for each assertion of the clock signal 99. The Trace RAM is preferably high-speed memory, such as high speed Static Random Access Memory (SRAM), with a write time no longer than the width of the clock signal 99. The entire Trace entry is typically a power of two ($2^x$) in size, such as 16, 32, 64, or 128 bits in size. The Trace RAM will typically contain a power of two ($2^y$) number of Trace entries. This allows for easy wrapping of the address counter 204 when computing memory write addresses 212. The Trace RAM in the preferred embodiment contains 512 ($2^9$) Trace entries.

Figure 15:
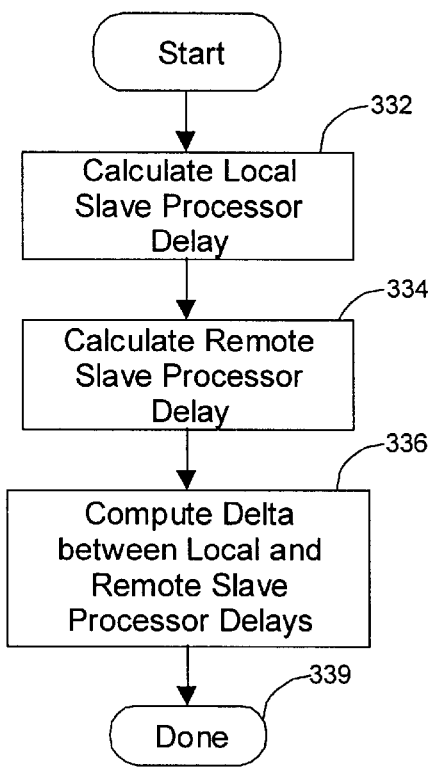
FIG. 15 is a flowchart illustrating operation of the Calibrate procedure, in accordance with a preferred embodiment of the present invention.

FIG. 15 is a flowchart illustrating operation of the Calibrate procedure, in accordance with a preferred embodiment of the present invention. The Calibrate procedure is utilized to determine the difference in timing between cache accesses between two processors 92 in the same processor module 90 sharing the same L2 cache 94, and two processors 92 in different processor modules 90 not sharing the same L2 cache 94.

The Calibrate procedure starts by calculating a local slave processor 92 delay (see FIG. 16), step 332. In this case, the master processor 92 and the slave processor 92 are in the same processor module 90 and share the same L2 cache 94. Then, the Calibrate procedure calculates a remote slave processor 92 delay (see FIG. 16), step 334. This time, the master processor 92 and the slave processor 92 are in different processor modules 90 and do not share the same L2 cache 94. Next, the difference between the remote processor delay calculated in step 334 and the local slave processor delay calculated in step 332 is calculated, step 336. This "Delta" value is utilized whenever it is necessary to take into account the difference in timing between local and remote processors. The Calibrate procedure is then complete, step 338.

Figure 16:
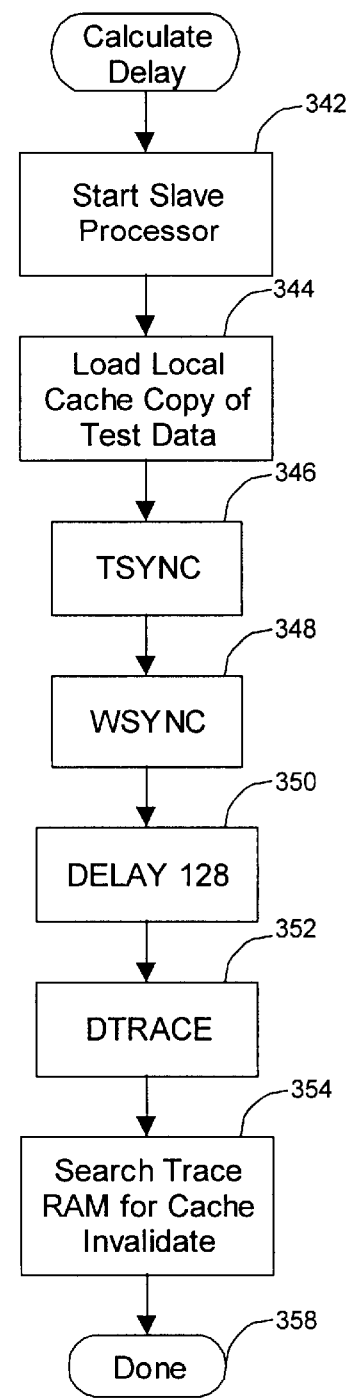
FIG. 16 is a flowchart illustrating operation of the Calculate Processor Delay procedure in steps 132 and 134 in FIG. 15.

FIG. 16 is a flowchart illustrating operation of the Calculate Processor Delay procedure in steps 332 and 334 in FIG. 15. It enters with a processor number for the slave processor being tested as a parameter. First, the slave processor is started, step 342. In the preferred embodiment, this is accomplished by issuing a connect request (CIOC) to the slave processor. Then, a local copy of a specified word in memory is loaded into the local cache 256 of the master processor 92, step 344. Next, a TSYNC instruction is executed in order to transmit a "Synchronize" signal to both the slave processor and itself. Note that since the Synchronize signal is preferrably routed through the SCU 86, it takes the same length of time to arrive regardless of which processor issued the request.

Next, a WSYNC operation is executed in order to wait for the Synchronize signal just sent, step 348. Note that in the preferred embodiment, the TSYNC instruction executed in step 344 includes WSYNC functionality. However, in an alternative embodiment, where this functionality is separate, a WSYNC instruction is executed here at step 348. Upon receiving the Synchronize signal, in the preferred embodiment, a Trace operation is automatically started. In an alternative embodiment, where the WSYNC does not automatically start the Trace function, the Trace is started by following each WSYNC with a TRACE instruction. Then, after exiting from the WSYNC instruction, step 348 (or in the alternate embodiment, after the TRACE instruction has started the Trace), a floating point load instruction is executed in order to uniquely identify the start of the relevant Trace. This is followed by a DELAY instruction is executed with a count large enough to cover the time it takes for an invalidate cache command to be received from the slave, step 350. In the preferred embodiment, the DELAY count is 128, providing for a 128 cycle delay.

The Trace RAM 210 is then dumped to memory with execution of a DTRACE instruction, step 352. Then the Trace RAM 210 contents now stored in memory are searched first for the floating point load instruction, and then for a cache line invalidate cache command, step 354. The number of Trace RAM 210 entries between the floating point load instruction and the invalidate cache line cache command corresponds to the number of machine cycles of delay were encountered between the time that the slave processor issued the invalidate cache command, and it was received by the master processor. The master processor can then optionally DELAY for a reasonably long period of time before completing (not shown), and then the Compute Delay procedure is complete, step 358.

Figure 17:
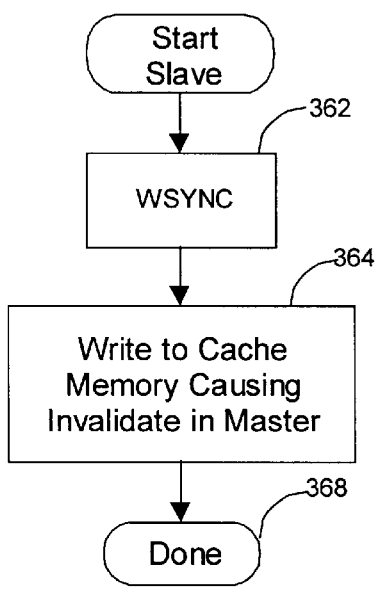
FIG. 17 is a flowchart illustrating the slave processor procedure for use in calculating memory delays, in accordance with a preferred embodiment of the present invention.

FIG. 17 is a flowchart illustrating the slave processor procedure for use in calculating memory delays, in accordance with a preferred embodiment of the present invention. The slave processor is started in step 342. First, it performs a WSYNC instruction, step 362. This has the effect of stalling that processor until a Synchronize signal is received from the SCU, and ultimately, from the master processor. Then a write is made to cache memory that causes the local copy of the word of data to be invalidated, step 364. The slave processor is now done, step 368.

The Calibrate procedure operates by determining the time (or the number of cycles) that it takes a cache invalidate to travel from the local cache 256 of a slave processor 92 to the local cache 256 of the master processor 92, where it is recorded in the Trace RAM 210 of the master. This is done twice, once with a local slave processor, and once with a remote slave processor. In the case of the local slave processor 92, the cache line invalidate cache signal travels from the local cache 256 of the local slave to the shared L2 cache 94 and thence to the local cache 256 of the master processor. In the case of the remote slave processor, this cache line invalidate signal travels from the local cache 256 of the slave processor to its L2 cache 94, then across the system bus 82 to the L2 cache 94 and then local cache 256 of the master processor 92. The Delta value computed is essentially the number of cycles that it takes the cache line invalidate cache signal to travel between the two L2 caches 94.

The master processor 92 loads a specified word of memory into a register. The result is that its local cache 256 contains a local shared copy of the cache line containing that specified word of memory. Then, the slave processor 92 stores into that specified word in memory. In order for this to happen, its local cache 256 must get exclusive ownership of the cache line containing that specified word. The local copy of that cache line is no longer valid in the local cache of the other processors 92. An cache line invalidate cache command is thus issued to all the other processors 92 having local shared copies of the cache line to invalidate their copies of the cache line containing the specified word of memory.

A DELAY instruction is executed by the master processor 92 while waiting for this to occur. The DELAY instruction does not cause other cache activity since it does not access memory, nor is it necessary to fetch another instruction for execution. It also provides a constant value to be recorded in the processor portion of each Trace entry. Meanwhile, the status of the local cache 256 is also being recorded in the Trace RAM 210. Each clock cycle results in one entry in the Trace RAM 210. A floating point load instruction is executed by the master processor 92. This results in a unique Trace RAM 210 entry being made in that processors Trace RAM. Later, the cache invalidate code is received by the master processor and is recorded in the cache status portion of its Trace RAM 210 that is later dumped to memory. The master processor 92 then searches for this special floating point instruction code followed by the invalidate cache line cache command in its dumped Trace RAM 210. The difference in location in the dumped Trace RAM 210 between the cache line invalidate cache command and the floating point load corresponds to the number of cycles it took for the master processor 92 to receive the invalidate signal, and thus corresponds to the number of cycles it takes for a signal to travel between the local cache 256 of the slave processor 92 and the local cache 256 of the master processor 92.

Note that the present invention also includes within its scope the swapping of functions where the master processor 92 generates the invalidate cache line cache signal which is received by the slave processors 92 and recorded in their Trace RAM 210. Also within the scope of this inventions are other means for determining how long it takes for one processor to receive a signal from another.

The DELTA value computed is computed dynamically. Thus, it controls for different timing values in different computer systems and through time. It can be used in a number of different situations, most particularly, when exhaustively testing the interaction between multiple processors 92 as shown in FIG. 7 et seq. For example, in step 380 of FIG. 8, the master processor 92 sets up Delay values for each of the processors 92 being tested. The DELTA value can be added to the Delay values for each of the processors sharing the L2 cache 94 with the master processor 92 (including the Delay value for the master processor itself). In certain situations, this may be slightly augmented by adding in the delay calculated in step 332 of FIG. 15 to the Delay values for the master processor 92 in step 380 to take into account the time it takes a signal to travel between local caches 256 in the same processor module 90.

Table T-2 is a table illustrating the instructions executed by the Master, local Slave, and remote Slave processors 92 to perform the actual calibration, in accordance with a preferred embodiment of the present invention.

TABLE T-2

| T | Master Processor Instructions | | Local Slave Instructions | | Remote Slave Instructions | |
|---|---|---|---|---|---|---|
| 1 | TSYNC | | WSYNC | | WSYNC | |
| 2 | TZE | Error | TZE | Error | TZE | Error |
| 3 | FLD | Data | STA | Data* | STA | Data* |
| 3 | DELAY | 128 | DELAY | 128 | DELAY | 128 |
| 131 | DTRACE | Trace | | | | |

The operation of the above instructions were shown in their corresponding FIGs. implemented sequentially in flowcharts. Sequential flowcharts are used there solely for illustrative purposes. In the preferred embodiment, these instructions are implemented as a combination of firmware executed as microcode, and hardware. As such, steps in the flowcharts that appear to be sequential in the FIGs. may be executed in parallel in the preferred embodiment.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

Attachment

```
******************************************************
*CALIBRATION CODE                                     *
******************************************************
*THIS IS THE CONTROL CODE, OPERATIONAL PROCESSORS
*HAVE BEEN DETERMINED*
*CALIBRATION PROCESSORS HAVE BEEN SELECTED
*AND THEIR NUMBER STORED FOR*
*USE CONNECTING TO THEM PRIOR TO ENTERING THIS CODE.*
******************************************************
STCAL:LDA:=o10,DL
:STA:0,X5:STORE NEW STATE FOR MASTER, STARTING LOCAL CALB
:LDA:CALBLK:GET READ COPY OF BLOCK TO BE INVALIDATED IN CACHE
:LDA:LCCALP:GET LOCAL SLAVE PROC# TO BE USED IN CALIBRATION
:CIOC:0:CONNECT TO LOCAL SLAVE PROC TO START CALIBRATION RUN
*SLAVE CONNECT ROUTINE WILL BE OMITTED,
*THE LOCAL SLAVE WILL END UP AT CALBLS SUBROUTINE
:DLY:CONDLY:WAIT AND MAKE SURE THE SLAVE IS READY
:LDX0:CLRET1:LOAD RETURN ADDRESS
:TRA:CALBM1:START CALIBRATION, TRA TO MASTER ROUTINE (LOCAL CAL)
CLRET1:DTRACE:DATM1:DUMP TRACE TABLE FOR LOCAL CALIBRATION RUN
:LDA:CALBLK:GET READ COPY OF BLOCK TO BE INVALIDATED IN CACHE
:LDA:RMCALP:GET REMOTE SLAVE PROC# TO BE USED IN CALIBRATION
:CIOC:0:CONNECT TO REMOTE SLAVE PROC TO START CALIBRATION RUN
*SLAVE CONNECT ROUTINE WILL BE OMITTED,
*THE REMOTE SLAVE WILL END UP AT CALBRS SUBROUTINE
:DLY:CONDLY:WAIT AND MAKE SURE THE SLAVE IS READY
:LDX0:CLRET2:LOAD RETURN ADDRESS
:TRA:CALBM2:START CALIBRATION, TRA TO MASTER ROUTINE (REMOTE CAL)
CLRET2:DTRACE:DATM2:DUMP TRACE TABLE FOR REMOTE CALIBRATION RUN
:LDX6:RMCALP:GET REMOTE PROC NUMBER TO UPDATE ITS STATE
:LDA:=o200,DL
:STA:CPU0,X6:STORE NEW STATE FOR REMOTE CALIBRATION PROCESSOR
:LDX6:LCCALP:GET LOCAL PROC NUMBER TO UPDATE ITS STATE
:STA:CPU0,X6:STORE NEW STATE FOR LOCAL CALIBRATION PROCESSOR
:LDX6:MASTER:GET MASTER PROC NUMBER
:STA:CPU0,X6:STORE NEW STATE FOR MASTER PROCESSOR
******************************************************
*THIS CODE WILL EXTRACT THE LOCAL—>REMOTE DELTA FROM THE TRACES*
******************************************************
:LDX3:0,DL
:LDX2:=512,DL
FLDLP:LDA:DATM1,X2:GET LAST WORD OF TRACE FROM DUMP
:ANA:MSKKRM:MASK OUT ALL BUT CACHE STATE
:ARS:SFTKRM:SHIFT IT RIGHT TO ALLIGN THE KROM STATE
:CMPA:FLDKRM:COMPARE TO FLD STATE
:TZE:FLDFND:FOUND THE FLD
:SBX2:1,DL
:TZE:FLDFL:IF ZERO, FAILED TO FIND FLD, SET ERROR FLAGS AND EXIT
:TRA:FLDLP
FLDFND:ADX2:1,DL
:CMPX2:=512,DL
:TZE:INVFL:IF ZERO, FAILED TO FIND INVALIDATE, SET ERROR FLAGS AND EXIT
:LDA:DATM1,X2:LOAD TRACE WORD FROM DUMP
:ANA:MSKKRM:MASK OUT ALL BUT CACHE STATE
:ARS:SFTKRM:SHIFT IT RIGHT TO ALLIGN THE KROM STATE
:CMPA:INVKRM:COMPARE TO INVALIDATE KROM STATE
:TZE:INVFND:IF ZERO, FOUND INVALIDATE, BRANCH
:ADX3:1,DL:ADD ONE TO (INV-FLD)
:TRA:FLDFND
INVFND:STX3:LOCCNT:STORE LOCAL COUNT (INV-FLD)
:LDX3:0,DL
:LDX2:=512,DL
FLDLP2:LDA:DATM2,X2:GET LAST WORD OF TRACE FROM DUMP
:ANA:MSKKRM:MASK OUT ALL BUT CACHE STATE
:ARS:SFTKRM:SHIFT IT RIGHT TO ALLIGN THE KROM STATE
:CMPA:FLDKRM:COMPARE TO FLD STATE
:TZE:FLDFN2:FOUND THE FLD
:SBX2:1,DL
:TZE:FLDFL:IF ZERO, FAILED TO FIND FLD, SET ERROR FLAGS AND EXIT
:TRA:FLDLP2
FLDFN2:ADX2:1,DL
:CMPX2:=512,DL
:TZE:INVFL:IF ZERO, FAILED TO FIND INVALIDATE, SET ERROR FLAGS AND EXIT
:LDA:DATM2,X2:LOAD TRACE WORD FROM DUMP
:ANA:MSKKRM:MASK OUT ALL BUT CACHE STATE
:ARS:SFTKRM:SHIFT IT RIGHT TO ALLIGN THE KROM STATE
:CMPA:INVKRM:COMPARE TO INVALIDATE KROM STATE
```

-continued

Attachment

```
:TZE:INVFN2:IF ZERO, FOUND INVALIDATE, BRANCH
:ADX3:1,DL:ADD ONE TO (INV-FLD)
:TRA:FLDFN2
INVFN2:STX3:REMCNT:STORE REMOTE COUNT (INV-FLD)
:LDX2:LOCCNT
:LDA:REMCNT:LOAD A REGISTER WITH REMOTE COUNT
:SBA:LOCCNT:A REGISTER = REMOTE COUNT − LOCAL COUNT
:TMI:OOPS:SOMETHING MUST BE WRONG IF DELTA IS NEGATIVE
:STA:DELTA:STORE THE TIMING OFFSET VALUE
:TRA:SETSTR
*****************************************************
*LOCAL CALIBRATION MACROS (MASTER PLUS LOCAL SLAVE)         *
*****************************************************
CALBM1:HEXDEC
:TSYNC:MAXWT:INITIATE SYNC
:DLY:128
:TZE:FAILCL:IF THE COUNT FOR THE SYNC EXPIRED, SET ERROR
:FLD:MSFLD:DO A FLOATING LOAD TO SET A UNIQUE MARKER IN THE TRACE
:NOP:CALBLK:THE MASTER SHD BE GETTING AN INVALIDATE FRM A LCL SLAVE
:DLY:512
:TRA:0,X0:RETURN
CALBLS:HEXDEC
:WSYNC:MAXWT:WAIT FOR SYNC PULSE
:DLY:128
:TZE:FAILCL:IF THE COUNT FOR THE SYNC EXPIRED, SET ERROR
:FLD:LSFLD:DO A FLOATING LOAD TO SET A UNIQUE MARKER IN THE TRACE
:STA:CALBLK:CAUSING AN INVALIDATE IN THE MASTER
:DLY:512
:TRA:0,X0:RETURN
*****************************************************
*REMOTE CALIBRATION MACROS (MASTER PLUS REMOTE SLAVE)        *
*****************************************************
CALBM2:HEXDEC
:TSYNC:MAXWT:INITIATE SYNC
:DLY:128
:TZE:FAILCL:IF THE COUNT FOR THE SYNC EXPIRED, SET ERROR
:FLD:MSFLD:DO A FLOATING LOAD TO SET A UNIQUE MARKER IN THE TRACE
:NOP:CALBLK:THE MASTER SHD BE GETTING INVALIDATE FRM REMOTE SLAVE
:DLY:512
:TRA:0,X0:RETURN
CALBRS:HEXDEC
:WSYNC:MAXWT:WAIT FOR SYNC PULSE
:DLY:128
:TZE:FAILCL:IF THE COUNT FOR THE SYNC EXPIRED, SET ERROR
:FLD:RSFLD:DO A FLOATING LOAD TO SET A UNIQUE MARKER IN THE TRACE
:STA:CALBLK:CAUSING AN INVALIDATE IN THE MASTER
:DLY:512
:TRA:0,X0:RETURN
```

What is claimed is:

1. In a data processing system having a plurality of processors, a method of dynamically calculating a difference between a time it takes a signal to travel between a first test processor and a second test processor and a time it takes a signal to travel between the first test processor and a third test processor, the first test processor being one of a first pair of test processors, the second test processor being one of the first pair of test processors, and the third test processor being one of a second pair of test processors,
said method comprising:
  A) calculating a first delay time for the time it takes the signal to travel between the first test processor and the second test processor by:
    1) providing a Synchronize signal to each of the first and second test processors;
    2) waiting for the Synchronize signal by each of the first and second test processors;
    3) providing a local copy of a specified cache line in a local cache memory of the first test processor before the synchronize signal is provided in substep A)1);
    4) signaling the first test processor to invalidate the local copy of the specified cache line in the local cache memory of the first test processor after both the first and second test processors complete the waiting in substep A)2);
    5) recording the invalidating in substep A)4) in a trace entry in a trace in the first test processor; and
    6) finding the trace entry in the trace containing the invalidating in substep A)4);
  B) calculating a second delay time for the time it takes the signal to travel between the first test processor and the third test processor by:
    1) providing a Synchronize signal to each of the first and third test processors;
    2) waiting for the Synchronize signal by each of the first and third test processors;
    3) providing a local copy of a specified cache line in a local cache memory of the first test processor before the synchronize signal is provided in substep B)1);
    4) signaling the first test processor to invalidate the local copy of the specified cache line in the local cache memory of the first test processor after both of the test processors complete the waiting in substep B)2);

5) recording the invalidating in substep B)4) in a trace entry in a trace in the first test processor; and
6) finding the trace entry in the trace containing the invalidating in substep B)4); and C) calculating the difference by subtracting the first delay time from the second delay time.

2. The method in claim 1 wherein:
the method further comprises:
D) repeating step A) for each processor sharing a memory with the first test processor; and
E) repeating step B) for each processor not sharing the memory with the first test processor.

3. The method in claim 2 wherein:
steps A), B), C), D) and E) are repeated with each processor being the first test processor.

4. The method in claim 3 which further comprises:
F) comparing the first delay time calculated in steps A) and D) for each processor sharing the memory with the first test processor; and
G) comparing the second delay time calculated in steps B) and E) for each processors not sharing the memory with the first test processor.

5. The method in claim 2 wherein:
the method further comprises:
F) comparing the first delay time calculated in steps A) and D) for each processors sharing the memory with the first test processor; and
G) comparing the second delay time calculated in steps B) and E) for each of the processor not sharing the memory with the first test processor.

6. The method in claim 1 wherein:
the signaling in substep A)4) is a result of a store by the second test processor into the specified cache line; and
the signaling in substep B)4) is a result of a store by the third test processor into the specified cache line.

7. The method in claim 6 wherein:
step A) further comprises:
7) recording a unique entry in the trace in the first test processor before the recording in substep A)5); and
step B) further comprises:
7) recording a unique entry in the trace in the first test processor before the recording in substep B)5).

8. The method in claim 1 wherein:
substep A)6) comprises:
searching the trace for the trace entry containing a unique code; and
substep B)6) comprises:
searching the trace for the trace entry containing a unique code.

9. The method in claim 8 wherein:
the unique code is a floating point load instruction.

10. The method in claim 1 wherein:
the first test processor and the second test processor share a first memory; and
the third test processor does not share the first memory.

11. The method in claim 1 wherein step A) further comprises:
7) delaying execution of the first test processor by a prespecified number of cycles; and
step B) further comprises:
7) delaying execution of the first test processor by the prespecified number of cycles.

12. The method in claim 1 which further comprises:
D) exhaustively testing interactions among the first test processor, the second test processor, and the third test processor by varying a delay for each of these test processors and by offsetting the delay for the second test processor by the difference computed in step C).

13. In a data processing system having a plurality of processors and containing software stored in a Computer Software Storage Medium for dynamically calculating a difference between a time it takes a signal to travel between a first test processor and a second test processor and a time it takes a signal to travel between the first test processor and a third test processor, the first test processor being one of a first pair of test processors, the second test processor being one of the first pair of test processors, and the third test processor being one of a second pair of test processors, said software comprising:

A) a set of computer instructions stored in the Computer Software Storage Medium for calculating a first delay time for the time it takes the signal to travel between the first test processor and the second test processor comprising:
  1) a subset of computer instructions for providing a Synchronize signal to each of the first and second test processors;
  2) a subset of computer instructions for waiting for the Synchronize signal by each of the first and second test processors;
  3) a subset of computer instructions for providing a local copy of a specified cache line in a local cache memory of the first test processor before the synchronize signal is provided in subset A)1);
  4) a subset of computer instructions for signaling the first test processor to invalidate the local copy of the specified cache line in the local cache memory of the first test processor after both of the test processors complete the waiting in subset A)2);
  5) a subset of computer instructions for recording the invalidating in substep A)4) in a trace entry in a trace in the first test processor; and
  6) a subset of computer instructions for finding the trace entry in the trace containing the invalidating in subset A)4);

B) a set of computer instructions stored in the Computer Software Storage Medium for calculating a second delay time for the time it takes the signal to travel between the first test processor and the third test processor comprising:
  1) a subset of computer instructions for providing a Synchronize signal to each of the first and third test processors;
  2) a subset of computer instructions for waiting for the Synchronize signal by each of the first and third test processors;
  3) a subset of computer instructions for providing a local copy of a specified cache line in a local cache memory of the first test processor before the synchronize signal is provided in subset B)1);
  4) a subset of computer instructions for signaling the first test processor to invalidate the local copy of the specified cache line in the local cache memory of the first test processor after both of the test processors complete the waiting in subset B)2);
  5) a subset of computer instructions for recording the invalidating in substep B)4) in a trace entry in a trace in the first test processor; and
  6) a subset of computer instructions for finding the trace entry in the trace containing the invalidating in subset B)4); and C) a set of computer instructions stored in the Computer Software Storage Medium for calculating the difference by subtracting the first delay time from the second delay time.

14. The software in claim 13 wherein:

the first test processor and the second test processor share a first memory; and the third test processor does not share the first memory.

15. The software in claim 13 wherein set A) further comprises:

7) a subset of computer instructions for delaying execution of the first test processor by a prespecified number of cycles; and set B) further comprises 7) a subset of computer instructions for delaying execution of the first test processor by the prespecified number of cycles.

\* \* \* \* \*